US008259640B2

(12) United States Patent
Dankberg et al.

(10) Patent No.: US 8,259,640 B2
(45) Date of Patent: Sep. 4, 2012

(54) BROADBAND DEMODULATOR FOR MODIFIED DOWNSTREAM WAVEFORM

(75) Inventors: Mark D. Dankberg, Encinitas, CA (US); William H. Thesling, Hudson, OH (US)

(73) Assignee: ViaSat, Inc., Carlsbad, CA (US)

(*) Notice: Subject to any disclaimer, the term of this patent is extended or adjusted under 35 U.S.C. 154(b) by 930 days.

(21) Appl. No.: 12/174,196

(22) Filed: Jul. 16, 2008

(65) Prior Publication Data
US 2009/0022086 A1 Jan. 22, 2009

Related U.S. Application Data

(63) Continuation of application No. PCT/US2007/079517, filed on Sep. 26, 2007.

(60) Provisional application No. 60/827,985, filed on Oct. 3, 2006, provisional application No. 60/827,992, filed on Oct. 3, 2006, provisional application No. 60/827,997, filed on Oct. 3, 2006.

(51) Int. Cl.
*H04B 7/185* (2006.01)

(52) U.S. Cl. ........ 370/316; 370/310; 370/315; 370/319; 370/326; 370/329; 370/332; 370/349; 455/3.02

(58) Field of Classification Search .................. None
See application file for complete search history.

(56) References Cited

U.S. PATENT DOCUMENTS

| | | | |
|---|---|---|---|
| 5,517,250 A | 5/1996 | Hoogenboom et al. | |
| 5,898,681 A | 4/1999 | Dutta | |
| 6,487,183 B1 | 11/2002 | Lo et al. | |
| 6,511,020 B2 | 1/2003 | Higgins | |
| 6,735,188 B1 | 5/2004 | Becker et al. | |
| 6,847,626 B1 | 1/2005 | Carneal et al. | |
| 6,865,609 B1 | 3/2005 | Gubbi et al. | |
| 6,937,580 B2 | 8/2005 | Heatwole et al. | |
| 6,985,725 B2 | 1/2006 | Berger | |
| 7,027,454 B2 | 4/2006 | Dent | |
| 7,113,743 B2 | 9/2006 | Karabinis | |
| 7,142,809 B1 | 11/2006 | Godwin | |

(Continued)

FOREIGN PATENT DOCUMENTS

EP 1294139 A 3/2003

(Continued)

OTHER PUBLICATIONS

International Search Report, dated Nov. 28, 2008, corresponding to PCT International Application No. PCT/US2007/079517, filed Sep. 26, 2007, 3 pages.

(Continued)

*Primary Examiner* — Hassan Phillips
*Assistant Examiner* — Gautam Sharma
(74) *Attorney, Agent, or Firm* — Kilpatrick Townsend & Stockton LLP

(57) ABSTRACT

Systems, devices, processors, and methods are described for the transmission and reception of broadband signals between a gateway and subscriber terminals via satellite. In one set of embodiments, a wireless signal is generated and transmitted including a series of frames including a physical layer header and payload. A sub-channel identifier may be included in the physical layer header to identify the sub-channel for the payload, and allow for various novel filtering techniques at the subscriber terminal. The frames may be generated to be of substantially equal duration. Novel subscriber terminal configurations are described to leverage this formatting.

34 Claims, 27 Drawing Sheets

U.S. PATENT DOCUMENTS

| | | | |
|---|---|---|---|
| 7,149,526 B2 | 12/2006 | Karabinis et al. | |
| 7,203,204 B2 | 4/2007 | Carneal et al. | |
| 7,336,967 B2 | 2/2008 | Kelly et al. | |
| 7,415,001 B2 | 8/2008 | Naguleswaran et al. | |
| 7,450,914 B2 | 11/2008 | Valdivia et al. | |
| 2001/0009034 A1* | 7/2001 | Lee | 725/39 |
| 2002/0021678 A1 | 2/2002 | Heatwole et al. | |
| 2002/0031120 A1 | 3/2002 | Rakib | |
| 2002/0032003 A1 | 3/2002 | Avitzour et al. | |
| 2002/0080070 A1 | 6/2002 | Harles et al. | |
| 2003/0027522 A1 | 2/2003 | Valdivia et al. | |
| 2003/0039218 A1 | 2/2003 | Kwak | |
| 2003/0073435 A1 | 4/2003 | Thompson et al. | |
| 2004/0023658 A1 | 2/2004 | Karabinis et al. | |
| 2004/0111746 A1 | 6/2004 | Hoang | |
| 2004/0117499 A1 | 6/2004 | Liu et al. | |
| 2004/0157560 A1 | 8/2004 | Yamasaki | |
| 2004/0158857 A1* | 8/2004 | Finseth et al. | 725/39 |
| 2005/0047366 A1 | 3/2005 | Ghosh et al. | |
| 2005/0226418 A1* | 10/2005 | Lee et al. | 380/233 |
| 2006/0018340 A1 | 1/2006 | Tamura | |
| 2006/0239264 A1* | 10/2006 | Kang et al. | 370/390 |
| 2007/0268933 A1* | 11/2007 | Wu et al. | 370/474 |
| 2007/0286422 A1* | 12/2007 | Cocchi et al. | 380/239 |
| 2009/0022085 A1 | 1/2009 | Dankberg et al. | |
| 2009/0022087 A1 | 1/2009 | Dankberg et al. | |
| 2009/0081946 A1 | 3/2009 | Dankberg et al. | |
| 2009/0092037 A1 | 4/2009 | Hadad | |
| 2009/0129334 A1 | 5/2009 | Ma et al. | |

FOREIGN PATENT DOCUMENTS

| | | |
|---|---|---|
| WO | 2008/097367 A2 | 8/2008 |

OTHER PUBLICATIONS

International Preliminary Report on Patentability of Apr. 7, 2009 with Written Opinion for PCT Patent Application No. PCT/US2007/079517, 6 pages.

Interview Summary of Mar. 13, 2012 for U.S. Appl. No. 12/174,525; 3 pages.

Final Office Action of Jan. 31, 2012 for U.S. Appl. No. 12/174,525 20 pages.

Non-Final Office Action of Dec. 28, 2011 for U.S. Appl. No. 12/174,173, 16 pages.

Non Final Office Action of Jun. 9, 2011 for U.S. Appl. No. 12/174,173, 17 pages.

Non-Final Office Action of Aug. 4, 2011 for U.S. Appl. No. 12/174,525, 23 pages.

Notification of Publication and Entry into the Examination Procedure for Patent Application for Invention for Chinese Patent Application No. CN 2007800402934, issuing date Dec. 4, 2009, 3 pages.

Communication pursuant to Article 94(3) EPC of Oct. 7, 2009 for EP Patent Application No. EP 07872771.6, 2 pages.

* cited by examiner

700
Forward Channel
Diagram

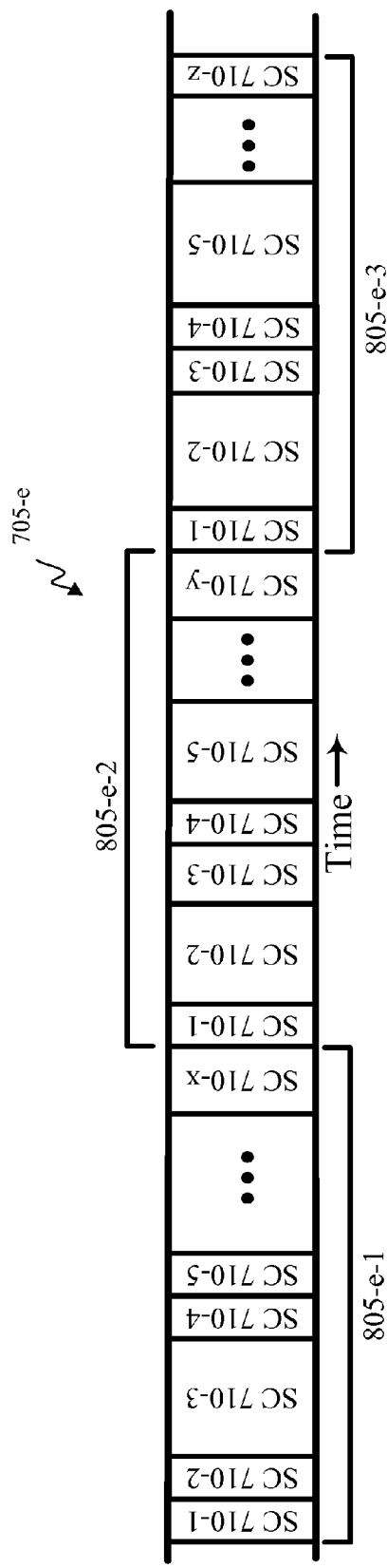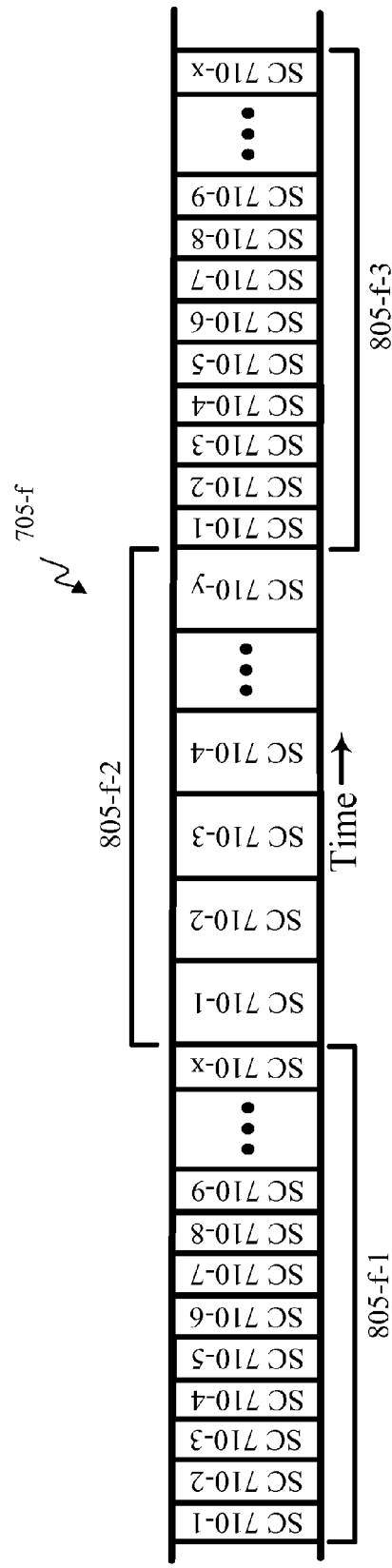
FIG. 9E
FIG. 9F

| Modcode 1655 | Block Size 1660 |
|---|---|
| QPSK 1/4 | BLKSZ 1 |
| QPSK 1/3 | BLKSZ 2 |
| QPSK 2/5 | BLKSZ 3 |
| QPSK 1/2 | BLKSZ 4 |
| QPSK 3/5 | BLKSZ 5 |
| QPSK 2/3 | BLKSZ 6 |
| QPSK 3/4 | BLKSZ 7 |
| QPSK 4/5 | BLKSZ 8 |
| QPSK 5/6 | BLKSZ 9 |
| QPSK 8/9 | BLKSZ 10 |
| QPSK 9/10 | BLKSZ 11 |
| 8PSK 3/5 | BLKSZ 12 |
| 8PSK 2/3 | BLKSZ 13 |
| 8PSK 3/4 | BLKSZ 14 |
| 8PSK 5/6 | BLKSZ 15 |
| 8PSK 8/9 | BLKSZ 16 |
| 8PSK 9/10 | BLKSZ 17 |
| 16APSK 2/3 | BLKSZ 18 |
| 16APSK 3/4 | BLKSZ 19 |
| 16APSK 4/5 | BLKSZ 20 |
| 16APSK 5/6 | BLKSZ 21 |
| 16APSK 8/9 | BLKSZ 22 |
| 16APSK 9/10 | BLKSZ 23 |
| 32APSK 3/4 | BLKSZ 24 |
| 32APSK 4/5 | BLKSZ 25 |
| 32APSK 5/6 | BLKSZ 26 |
| 32APSK 8/9 | BLKSZ 27 |
| 32APSK 9/10 | BLKSZ 28 |

BROADBAND DEMODULATOR FOR MODIFIED DOWNSTREAM WAVEFORM

CROSS-REFERENCE TO RELATED APPLICATIONS

This application is a Continuation of International Application No. PCT/US2007/079517, filed Sep. 26, 2007, entitled "Downstream Waveform Sub-Channelization for Satellite Communications", and claims the benefit thereof under 35 U.S.C. 120, which claims the benefit under 35 U.S.C. 119(e) of U.S. Provisional Patent Application No. 60/827,985, filed Oct. 3, 2006, entitled "Aggregate Rate Modem", U.S. Provisional Patent Application No. 60/827,992, filed Oct. 3, 2006, entitled "Downstream Waveform Modification", and U.S. Provisional Patent Application No. 60/827,997, filed Oct. 3, 2006, entitled "Broadband Demodulator For Modified Downstream Waveform". This application is related to the following U.S. patent applications: U.S. patent application Ser. No. 12/174,525, filed concurrently herewith, entitled "Aggregate Rate Modem", and U.S. patent application Ser. No. 12/174,173, filed concurrently herewith, entitled "Downstream Waveform Modification". This application hereby incorporates by reference herein the content of the aforementioned applications in their entirety and for all purposes.

This application expressly incorporates by reference each of the following patent applications in their entirety for all purposes:

PCT Application Serial No. PCT/US2007/079577, filed on Sep. 26, 2007, entitled "Improved Spot Beam Satellite Ground Systems";

PCT Application Serial No. PCT/US2007/079561, filed on Sep. 26, 2007, entitled "Multi-Service Provider Subscriber Authentication";

PCT Application Serial No. PCT/US2007/079565, filed on Sep. 26, 2007, entitled "Large Packet Concatenation In Satellite Communication System";

PCT Application Serial No. PCT/US2007/079569, filed on Sep. 26, 2007, entitled "Upfront Delayed Concatenation In Satellite Communication System";

PCT Application Serial No. PCT/US2007/079571, filed on Sep. 26, 2007, entitled "Map-Trigger Dump Of Packets In Satellite Communication System";

PCT Application Serial No. PCT/US2007/079563, filed on Sep. 26, 2007, entitled "Web/Bulk Transfer Preallocation Of Upstream Resources In A Satellite Communication System";

PCT Application Serial No. PCT/US2007/079567, filed on Sep. 26, 2007, entitled "Improved Spot Beam Satellite Systems";

PCT Application Serial No. PCT/US2007/079523, filed on Sep. 26, 2007, entitled "Packet Reformatting For Downstream Links"; and PCT Application Serial No. PCT/US2007/079541, filed on Sep. 26, 2007, entitled "Upstream Resource Allocation For Satellite Communications".

BACKGROUND OF THE INVENTION

The present invention relates to wireless communications in general and, in particular, to a satellite communications network.

Consumer broadband satellite services are gaining traction in North America with the start up of network services using Ka band satellites. While such first generation satellite systems may provide multi-gigabit per second (Gbps) per satellite overall capacity, current designs of such systems inherently limit the number of customers who may be served with sufficient bandwidth. Because this capacity may be split across numerous coverage areas, the bandwidth to each subscriber may be limited.

While existing designs have a number of capacity limitations, the demand for such broadband services continues to grow. The past few years have seen strong advances in communications and processing technology. This underlying technology, in conjunction with selected sub-channelization techniques, may be harnessed to produce novel satellite communications systems and components to address this demand.

SUMMARY

Systems, devices, processors, and methods are described for the transmission and reception of a broadband signal between a gateway and subscriber terminals via satellite. In one set of embodiments, a wireless signal is generated and transmitted to the satellite from a gateway, the signal including a series of physical layer frames. Each frame includes a physical layer header and payload. A sub-channel identifier is included in the physical layer header to identify the sub-channel for the payload.

The wireless signal is received from a satellite. The received signal is processed to produce a digitized stream representative of the wireless signal. The digitized stream is processed to detect a header identifier identifying the physical layer header for a physical layer frame in the digitized stream. The header portion is demodulated and decoded to identify the sub-channel identifier for a physical layer payload associated with the header. In one embodiment, a determination is made as to whether the sub-channel identifier matches the sub-channel identifiers associated with payloads to be demodulated and decoded. Based on the determination, the physical layer payload may be forwarded for demodulation and decoding, or may be filtered.

Another set of embodiments employ adaptive coding and modulation, and a modulation and coding format for a frame may be set at the gateway. The format may be used to determine a block size for a payload for a physical layer frame, the block size set to produce layer frames of substantially equal duration. Data in the set block size is encapsulated to produce the payload for the frame. A physical layer header is appended to the payload for the physical layer frame. In certain embodiments, the header is formatted with a sub-channel identifier to allow filtering at the receiver. The wireless signal is generated and transmitted to the satellite from a gateway, the signal including a series of the physical layer frames.

In still another set of embodiments, such a wireless signal may be received from a satellite (e.g., by a subscriber terminal). As in other embodiments, the received signal is processed to produce a digitized stream representative of the wireless signal. The digitized signal may, thus, include a number of physical layer headers spaced substantially equidistant in time and each associated with a respective physical layer payload. The digitized signal is analyzed to detect a first header identifier identifying a first physical layer header of the digitized signal. The first physical layer header portion is demodulated and decoded to identify a first sub-channel identifier for an associated first physical layer payload. A header identifier detection analysis at one or more known header identifier locations is omitted, the omission based at least in part on the first sub-channel identifier. In some embodiments, a next location for a header identifier detection analysis is identified based on at least in part on the first sub-channel identifier and known spacing between headers.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 9A-9F are expanded diagrams of various channel and sub-channel formats according to embodiments of the invention.

FIG. 16B is a block diagram of a table formatted to determine block size for portions of physical layer frames according to various embodiments of the invention.

DETAILED DESCRIPTION OF THE INVENTION

This description provides exemplary embodiments only, and is not intended to limit the scope, applicability or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different than that described, and that various steps may be added, omitted or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Figure 1:
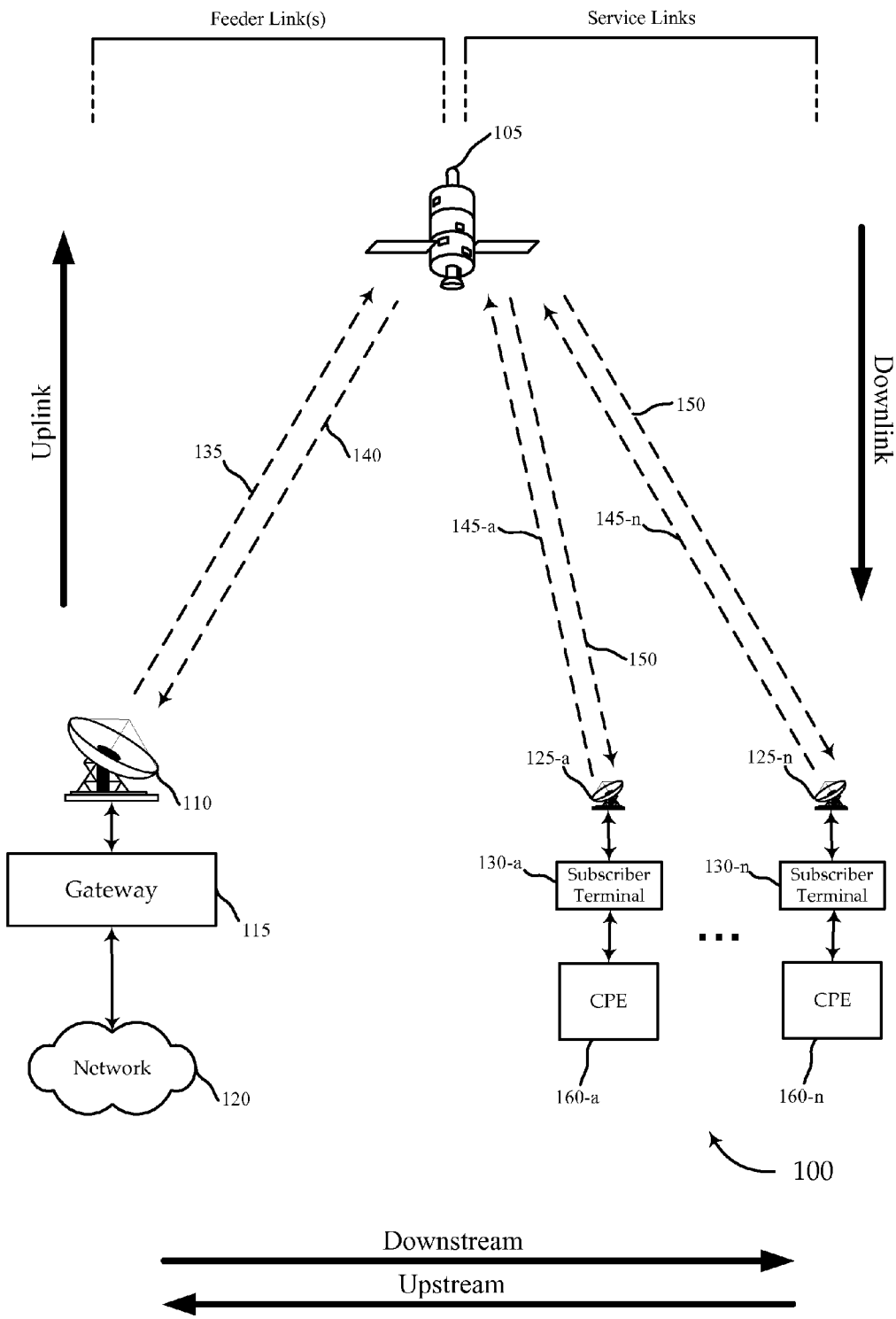
FIG. 1 is a block diagram of a satellite communications system configured according to various embodiments of the invention.

Referring first to FIG. 1, a block diagram illustrates an example satellite communications system 100 configured according to various embodiments of the invention. While a satellite communications system is used to illustrate various aspects of the invention, it is worth noting that certain principles set forth herein are applicable to a number of other wireless systems, as well. The satellite communications system 100 includes a network 120, such as the Internet, interfaced with a gateway 115 that is configured to communicate with one or more subscriber terminals 130, via a satellite 105.

The network 120 may be any type of network and can include, for example, the Internet, an IP network, an intranet, a wide-area network (WAN), a local-area network (LAN), a virtual private network (VPN), the Public Switched Telephone Network (PSTN), or any other type of network supporting data communication between any devices described herein. A network 120 may include both wired and wireless connections, including optical links. Many other examples are possible and apparent to those skilled in the art in light of this disclosure. The network may connect the gateway 115 with other gateways (not pictured), which are also in communication with the satellite 105, and which may share information on link conditions and other network metrics.

The gateway 115 provides an interface between the network 120 and the subscriber terminal 130. The gateway 115 may be configured to receive data and information directed to one or more subscriber terminals 130, and format the data and information (e.g., using Adaptive Coding and Modulation (ACM)) for delivery downstream to the respective subscriber terminals 130 via the satellite 105. Similarly, the gateway 115 may be configured to receive upstream signals from the satellite 105 (e.g., from one or more subscriber terminals 130) directed to a destination in the network 120, and can format the received signals for transmission through the network 120.

A device (not shown) connected to the network 120 may, therefore, communicate with one or more subscriber terminals 130 through the gateway 115. Data and information, for example IP datagrams, may be sent from a device in the network 120 to the gateway 115. The gateway 115 may format a Medium Access Control (MAC) frame in accordance with a physical layer definition for transmission to the satellite 105 via a downstream link 135. A variety of physical layer transmission modulation and coding techniques may be used with certain embodiments of the invention, including those defined with the DVB-S2 and WiMAX standards. In a number of embodiments, the gateway 115 utilizes ACM in conjunction with one or more of the traffic control and shaping techniques described herein to direct traffic to the individual terminals. The gateway 115 may use a broadcast signal, with a modulation and coding (modcode) format adapted for each packet to the link conditions of the terminal 130 or set of terminals 130 to which the packet is directed (e.g., to account for the variable service link 150 conditions from the satellite 105 to each respective terminal 130).

The gateway 115 may use an antenna 110 to transmit the signal to the satellite 105. In one embodiment, the antenna 110 is a parabolic reflector with high directivity in the direction of the satellite and low directivity in other directions. The downstream signals 135, 150 may include, for example, one (or more) single carrier signals. Each single carrier signal may be divided in time (e.g., using TDMA or other time division multiplexing techniques) into a number of sub-channels. The sub-channels may be the same size, or different sizes, and a range of options will be addressed below. In some embodiments, other channelization schemes may be integrated with or used in place of timedivided sub-channels, such as Frequency Division Multiple Access (FDMA), Orthogonal Frequency Division Multiple Access (OFDMA), Code Division Multiple Access (CDMA), or any number of hybrid or other schemes known in the art.

In one embodiment, a geostationary satellite 105 is configured to receive the signals from the location of antenna 110 and within the frequency band and specific polarization transmitted. The satellite 105 may, for example, use a reflector antenna, lens antenna, array antenna, active antenna, or other mechanism known in the art for reception and/or transmission of signals. The satellite 105 may process the signals received from the gateway 115 and transmit the signal from the gateway 115 to one or more subscriber terminals 130. In one embodiment, the satellite 105 operates in a multi-beam mode, transmitting a number of narrow beams each directed at a different region of the earth, allowing for frequency re-use. With such a multibeam satellite 105, there may be any number of different signal switching configurations on the satellite, allowing signals from a single gateway 115 to be switched between different spot beams. In one embodiment, the satellite 105 may be configured as a "bent pipe" satellite, wherein the satellite may frequency-convert the received carrier signals before retransmitting these signals to their destination, but otherwise perform little or no other processing on the contents of the signals. A variety of physical layer transmission modulation and coding techniques may be used by the satellite 105 in accordance with certain embodiments of the invention, including those defined with the DVB-S2 and WiMAX standards. For other embodiments a number of configurations are possible (e.g., using LEO satellites, or using a mesh network instead of a star network), as evident to those skilled in the art.

The service signals transmitted from the satellite 105 may be received by one or more subscriber terminals 130, via the respective subscriber antenna 125. In one embodiment, the antenna 125 and terminal 130 together make up a very small aperture terminal (VSAT). In other embodiments, a variety of other types of antennas 125 may be used at the subscriber terminal 130 to receive the signal from the satellite 105. Each of the subscriber terminals 130 may be a single user terminal or, alternatively, be a hub or router (not pictured) that is coupled with multiple user terminals. Each subscriber terminal 130 may be connected to consumer premises equipment (CPE) 160 (e.g., computers, local area networks, Internet appliances, wireless networks, etc.).

In one embodiment, a Multi-Frequency Time-Division Multiple Access (MF-TDMA) scheme is used for upstream links 140, 145, allowing efficient streaming of traffic while maintaining flexibility in allocating capacity among each of the subscriber terminals 130. In this embodiment, a number of frequency channels are allocated which may be fixed, or which may be allocated in a more dynamic fashion. A Time Division Multiple Access (TDMA) scheme is then employed in each frequency channel. In this scheme, each frequency channel may be divided into several timeslots that can be assigned to a connection (i.e., a subscriber terminal 130). In other embodiments, one or more of the upstream links 140, 145 may be configured with other schemes, such as TDMA, FDMA, OFDMA, CDMA, or any number of hybrid or other schemes known in the art.

A subscriber terminal 130 may transmit information related to signal quality to the gateway 115 via the satellite 105. The signal quality may be a measured signal-to-noise ratio, an estimated signal-to-noise ratio, a bit error rate, a received power level, or any other communication link quality indicator. The subscriber terminal 130 itself may measure or estimate the signal quality, or it may pass information measured or estimated by other devices. A subscriber terminal 130 may also transmit data and information to a network 120 destination via the satellite 105 and gateway 115. The subscriber terminal 130 transmits the signals via the upstream uplink 145 to the satellite 105 using the antenna 125. A subscriber terminal 130 may transmit the signals according to a variety of physical layer transmission modulation and coding techniques, including those defined with the DVB-S2 and WiMAX standards. In various embodiments, the physical layer techniques may be the same for each of the links 135, 140, 145, 150, or may be different. The gateway 115 may, in some embodiments, use this signal quality information to implement Adaptive Coding and Modulation (ACM), adjusting the modcode formats to each terminal or set of terminals based on their link conditions.

In one embodiment, a gateway 115 includes a Satellite Modem Termination System (SMTS), which is based at least in part on the Data-Over-Cable Service Interface Standard (DOCSIS). The SMTS in this embodiment includes a bank of modulators and demodulators for processing signals to be transmitted to or signals received from subscriber terminals 130. The SMTS in the gateway 115 performs the real-time scheduling of the signal traffic through the satellite 105, and provides the interfaces for the connection to the network 120. In other embodiments the scheduling operations may be performed by other components or devices employing other standards.

In this embodiment, the subscriber terminals 135 use portions of DOCSIS-based modem circuitry, as well. Therefore, DOCSIS-based resource management, protocols, and schedulers may be used by the SMTS for efficient provisioning of messages. DOCSIS-based components may be modified, in various embodiments, to be adapted for use therein. Thus, certain embodiments may utilize certain parts of the DOCSIS specifications, while customizing others.

While a satellite communications system 100 applicable to various embodiments of the invention is broadly set forth above, a particular embodiment of such a system 100 will now be described. In this particular example, approximately 2 gigahertz (GHz) of bandwidth is to be used, comprising four 500 megahertz (MHz) bands of contiguous spectrum. Employment of dual-circular polarization results in usable frequency comprising eight 500 MHz non-overlapping bands with 4 GHz of total usable bandwidth. This particular embodiment employs a multi-beam satellite 105 with physical separation between the gateways 115 and subscriber spot beams, and configured to permit reuse of the frequency on the various links 135, 140, 145, 150. A single Traveling Wave Tube Amplifier (TWTA) may be used for each service link spot beam on the downstream downlink, and each TWTA is operated at full saturation, or at an appropriate backoff, to maximize efficiency. A single wideband carrier signal, for example using one of the 500 MHz bands of frequency in its entirety, fills the entire bandwidth of the TWTA, thus allowing a reduced number of space hardware elements. Spotbeam size and TWTA power may be optimized to achieve maximum flux density on the earth's surface of—118 decibel-watts per meter squared per megahertz (dbW/m$^2$/MHz).

Figure 2:
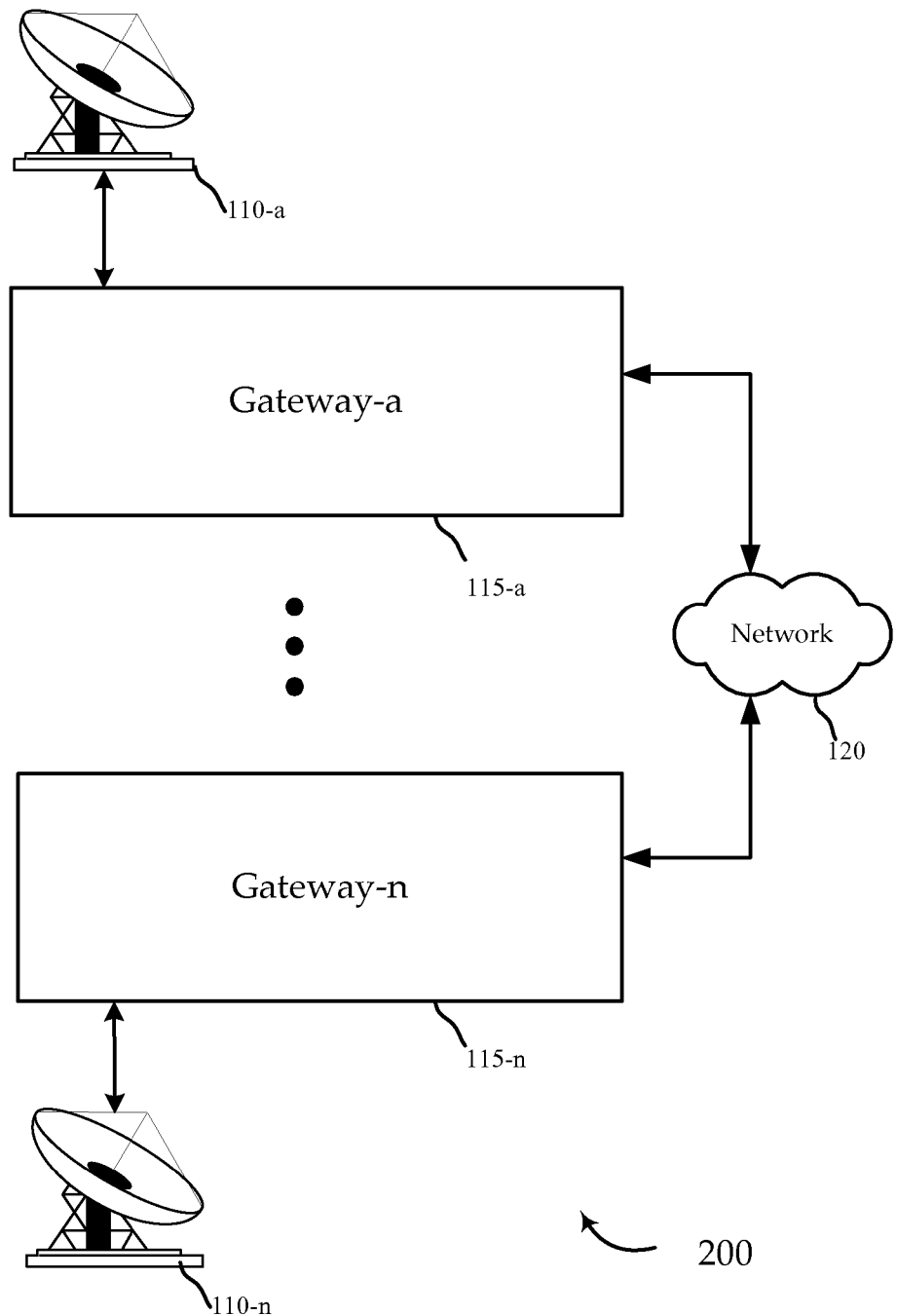
FIG. 2 is a block diagram of a ground system of gateways configured according to various embodiments of the invention.

Referring next to FIG. 2, an embodiment of a ground system 200 of gateways 115 is shown in block diagram form. One embodiment may have fifteen active gateways 115 (and possibly spares) to generate sixty service spot beams, for example. The ground system 200 includes a number of gateways 115 respectively connected with antennas 110. The gateways 115 are also each connected to a network 120.

In one embodiment, a gateway 115 (e.g., gateway 115 of FIG. 1) may upconvert and amplify a baseband signal (including data received from the network 120 or another gateway) for transmission through the downstream link 135 via the antenna 110. Each gateway 115 may also downconvert the upstream links 140, and perform other processing as explained below (perhaps for forwarding through the network 120). Each gateway 115 may process signals to allow the subscriber terminals 130 to request and receive information, and may schedule bandwidth for the forward and return channels. Additionally, a gateway 115 may provide configuration information and receive status from the subscriber terminals 130. Any requested or otherwise received information may be forwarded through the network.

Figure 3:
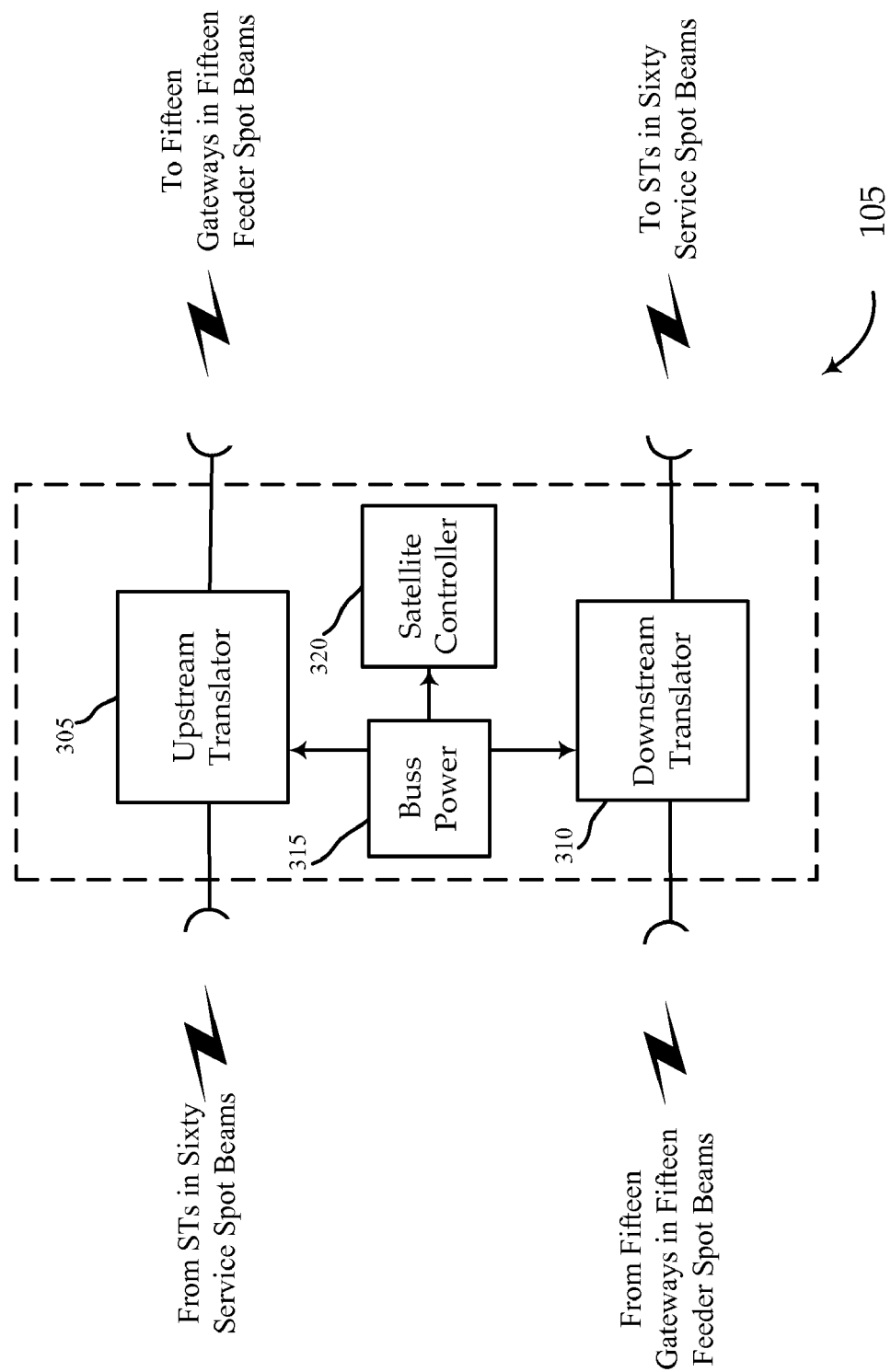
FIG. 3 is a block diagram of a satellite configured according to various embodiments of the invention.

Referring next to FIG. 3, an embodiment of a satellite 105 is shown in block diagram form. The satellite 105 in this embodiment communicates with fifteen gateways 115 and a number of subscriber terminals 130 using sixty feeder and service spot beams. Other embodiments could use more or fewer gateways/spot beams. There may be any number of subscriber terminals 130 divided by geography between the service link spot beams. Buss power 315 is supplied using a power source such as chemical fuel, nuclear fuel and/or solar energy. A satellite controller 320 is used to maintain altitude and otherwise control the satellite 105. Software updates to the satellite 105 can be uploaded from the gateway 115 and performed by the satellite controller 320.

Information passes in two directions through the satellite 105. A downstream translator 310 receives information from the fifteen gateways 115 for relay to subscriber terminals 130 using sixty service spot beams. An upstream translator 305 receives information from the subscriber terminals 130 occupying the sixty spot beam areas and relays that information to the fifteen gateways 115. This embodiment of the satellite can switch carrier frequencies in the downstream or upstream processors 310, 305 in a "bent-pipe" configuration, but other embodiments could do baseband switching between the various forward and return channels. The frequencies and polarization for each spot beam could be programmable or preconfigured.

Figure 4:
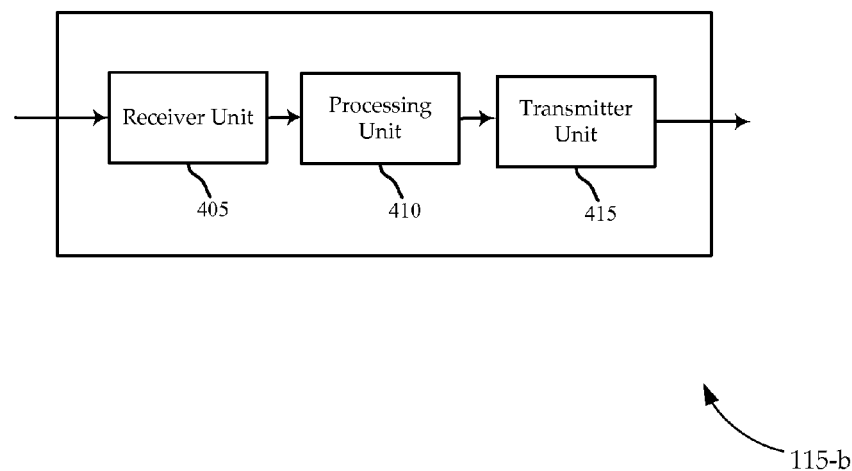
FIG. 4 is a block diagram of a gateway configured according to various embodiments of the invention.

Referring next to FIG. 4, an embodiment of a gateway 115-b (e.g., the gateway 115 of FIG. 1) is shown in block diagram form. In this embodiment, the gateway 115-b includes a receiver unit 405, a processing unit 410, and a transmitter unit 415, each in communication with each other directly or indirectly. These units of the device may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs) and other Semi-Custom ICs), which may be programmed in any manner known in the art. The functions of each unit may also be implemented, in whole or in part, with instructions embodied in a memory, formatted to be executed by one or more general or application-specific processors.

The receiver unit 405 may be configured to receive a set of data (e.g., from the network 120) to be transmitted via the satellite 105 and destined for one or more subscriber terminals 130. The receiver unit 405 may also be configured to receive data identifying link conditions for the one or more subscriber terminals 130. This information may be transmitted from the subscriber terminals 130 to the gateway 115 via the upstream links 140, 145. Alternatively, the link conditions may be received from one or more devices on the network 120, that compile link condition information passed from the subscriber terminals 130 or other sources.

The received link condition information may, for example, be organized and stored in an address/link condition table, located in memory (not shown). This table may be used by the processing unit 410 of the gateway 115 to look up the signal quality of a subscriber terminal 130 to which a packet is destined, based on a destination address. A variety of address mechanisms may be used to identify particular subscriber terminals, including a destination MAC destination VLAN-ID, a Destination Internet Protocol ("DIP") address, a private addressing ID, or any other set of data comprising or otherwise correlated with a destination address. The data address for data to be transmitted downstream 135, 150 may be parsed from a received data packet after arrival at the gateway 115, looked up in a routing table, or received in any other manner known in the art. It is also worth noting that a number of other data structures may also be used to relate an address to signal quality.

In addition, a modcode table (or other data structure associating signal quality and modcode) may be maintained and accessed by the processing unit 410 (e.g., by an ACM unit therein). The processing unit 410 may use the modcode table to determine the modcode to be used for packets destined for a subscriber terminal 130 operating in a given signal quality range. The table may contain a number of modcode formats, each corresponding to a specified signal quality range. Different modcode formats may have different codeword sizes, code rates, modulation schemes, and pilot insertions. Thus, using the signal quality attributed to a destination link for a packet, a signal quality range encompassing the link may be identified, and the appropriate modcode may be selected. Although certain embodiments utilize ACM, a number of embodiments described herein apply to non-ACM systems, devices, and components, as well.

Figure 5:
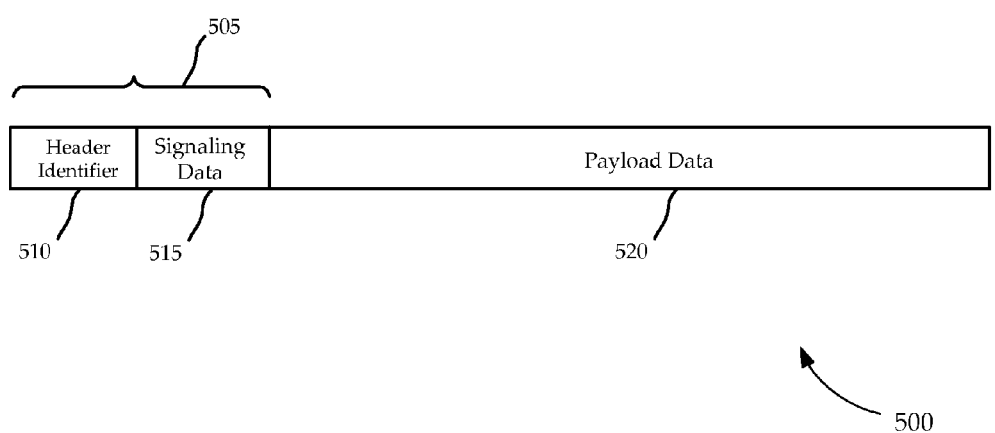
FIG. 5 is a block diagram of a frame formatted according to various embodiments of the invention.

With the applicable modcode selected, the processing unit 410 may encapsulate data received from the network to be transmitted via the satellite 105 to a subscriber terminal 130. FIG. 5 is a block diagram illustrating an example frame format 500 that may be used. A physical layer header 505 includes a header identifier 510 and signaling data 515. The header identifier 510 may be one of a set of unique identifiers, so that its known sequence may be readily identified. For example, the destination subscriber terminal 130 may use known patterns (one or more valid header identifiers) to correlate with a received signal. Destination terminals 130 may also be configured to store different sets of header identifiers 510, and thus frames may filter based on header identifier 510.

The remainder of header 505, the signaling data 515, includes modcode data and a sub-channel identifier. The modcode data identifies the modulation and coding (e.g., the particular codeword sizes, code rates, modulation schemes and pilot insertions) for encoded and modulated payload data 520 that is appended to the header 505. The header 505 (or parts thereof) may be protected by very low code rates so that it may be reliably received during poor SNR conditions. The encoded and modulated payload data 520, however, is in many embodiments adaptively coded on a per-terminal (or per-set of terminals) basis. By way of example, subscriber terminal 130 receiving a transmitted signal at a very low SNR may receive a frame 500 in which the encoded and modulated payload data 520 has been encoded at a very low code rate and at a very low order modulation. Conversely, a terminal 130 receiving a transmitted signal at a very high SNR may receive a frame 500 in which the encoded and modulated payload data 520 has been encoded at a very high code rate and at a very high order modulation.

In addition, the signaling data includes a sub-channel identifier configured to identify different frames as belonging to particular sub-channels. By utilizing sub-channel identifiers in a physical layer header 505, receiving devices (e.g., the subscriber terminals 130) may filter packets based on the sub-channel identifier without demodulating or decoding the payload 520. Thus, the information to be demodulated and decoded (e.g., payload 520 directed to other sub-channels and other subscriber terminals 130) may be limited or otherwise filtered thereby (as will be discussed in more detail below). A given sub-channel may, therefore, be a fraction (e.g., ¼, ⅛, 1/16) of the downstream channel. A subscriber terminal 130 may be configured to filter a frame 500, demodulating and decoding a payload 520 only if the sub-channel identifier in the signaling data 515 matches one or more sub-channels for the terminal.

Returning to FIG. 4, the encapsulated data (e.g., in the frame format 500 of FIG. 5) may be received by a transmitter unit 415 from the processing unit. The transmitter unit 415 may then upconvert and amplify this encapsulated data to produce a signal to be transmitted to the applicable subscriber terminal(s) via an antenna 110 and satellite 105.

Figure 6A:
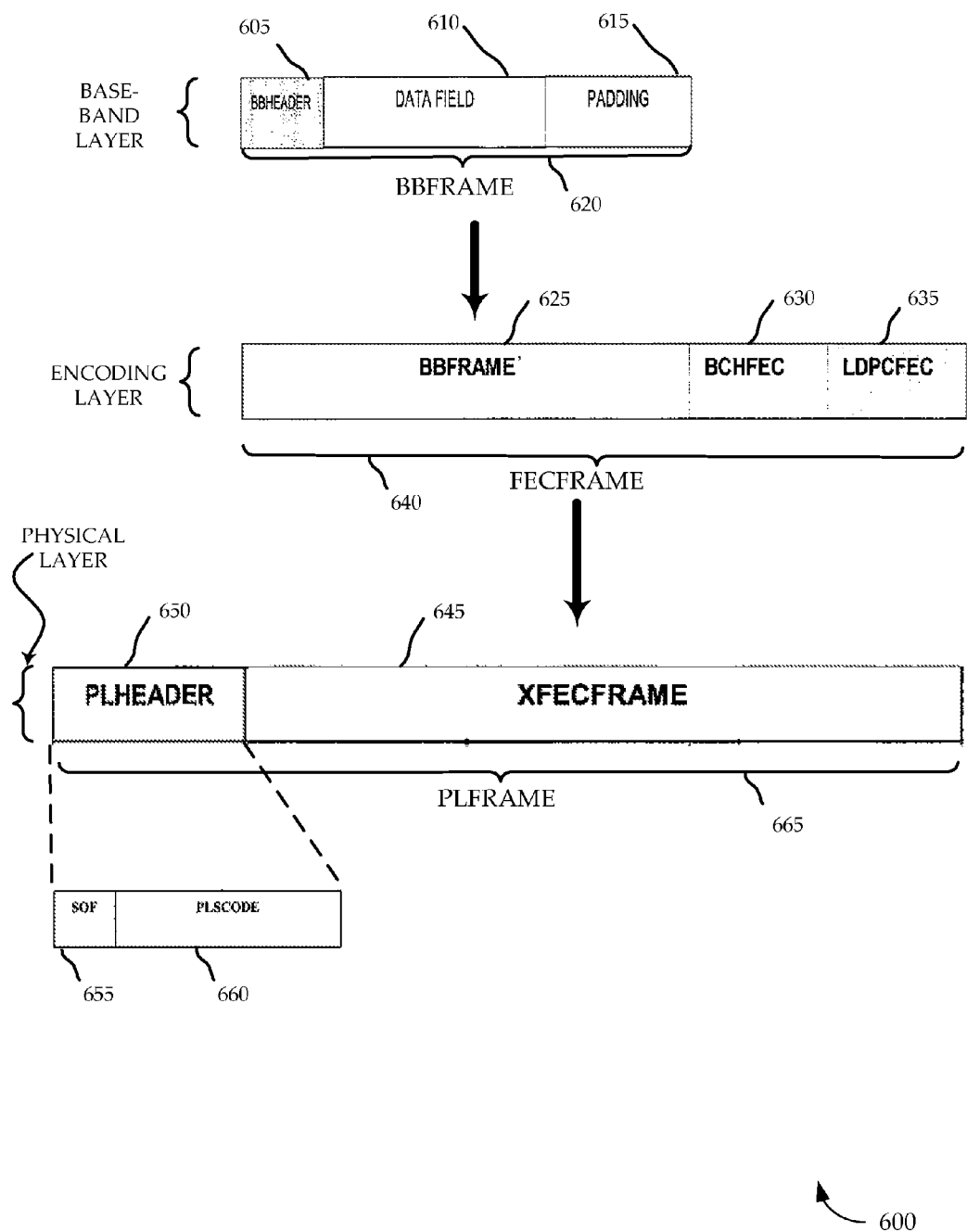
FIG. 6A is a block diagram of a modified DVB-S2 format according to various embodiments of the invention.

Turning to FIG. 6A, the framing format 600 for a frame of a DVB-S2 system is set forth to illustrate various aspects of the invention. The DVB-S2 frame format may be modified and used in the following manner to implement the frame 500 described with reference to FIG. 5. It is worth noting that in other embodiments, DVB-S, DVB-S2, WiMax, or other standards may be used, and this modified DVB-S2 format is for purposes of example only.

In one embodiment, each frame is broadcast to all terminals 130, but is only directed (e.g., using the sub-channel identifier) at a select subscriber terminal 130 (or small groups of terminals 130). For example, the waveform may be a single carrier waveform transmitted downstream from a gateway 115 to a subscriber terminal 130 in the system 100 of FIG. 1. As noted above, while the DVB-S2 system is used as an example, the principles specified herein are applicable to a range of systems.

The header identifier 510 of FIG. 5 may be implemented as the Start of Frame (SOF) 655 of FIG. 6A, and the signaling data 515 may be implemented as a modified Physical Layer Signaling code (PLSCODE) 660. The SOF 655 is a known 26-symbol pattern. The PLSCODE is a 64-bit linear binary code, which conveys seven bits of information. In total, the SOF 655 and PLSCODE 660 occupy 90 symbols. In one embodiment, the format for the PLSCODE 660 is modified from the DVB-S2 standard so that the seven bits carried inform receivers about the modcode (4 bits) and provide sub-channel identifier information (3 bits). In other embodiments, other formats are possible, with signaling data 515 of different sizes and formats. The PLSCODE 660 may be protected by a very low rate code to ensure that it can be read correctly even in very poor SNR conditions.

The base-band frame 620 of FIG. 6A is made up of a base-band header 605, a data field 610, and padding 615. Data in the data field may include one or more IP packets encapsulated in a MAC frame, or may include other types of data as well. The data field may include addressing information (e.g., IP address, MAC address, etc.) indicating the terminal or terminals (within the sub-channel) to which the packet will be directed. In some embodiments, IP packets associated with different modcodes may be transmitted in the same base-band frame 620, according to the lower order modcode. The DVB-S2 specification provides that certain frames will be of fixed size regardless of the modcode used (i.e., a normal FEC frame is 64,800 bits, and a shortened FEC frame is 16,200 bits), leading to frames with different time durations. However, in some embodiments, frame size may be varied according to the modcode selected for the frame, to thereby produce frames of uniform duration in time Interleaving and FEC encoding (e.g., BCH and LDCP) may then be performed on the base-band frame 620. This produces a FEC Frame 640, made up of an encoded base-band frame 625 with outer coding parity bits 630 and inner coding parity bits 635 appended. While, as noted above, the DVB-S2 specification provides that the FEC frame 640 will be of fixed data size, in other embodiments, the FEC frame 640 size may vary according to the modcode selected for the frame, to thereby produce frames of substantially uniform duration in time.

The FEC frame 640 is bit mapped to the applicable constellation (e.g., BPSK, QPSK, 8PSK, 16APSK, 32APSK, or any other modulation/constellation formats), to produce a XFEC frame 645. The XFEC frame 645 may be the payload data 520 of FIG. 5. A PL header 650 is added to the XFEC frame 645, together forming the PL frame 665. The PL header 650 (which may be the header 505 of FIG. 5) is formatted as described above and encoded. The PL frame 665 is then baseband shaped and quadrature modulated, as well as amplified and upconverted to be transmitted downstream.

Figure 6B:
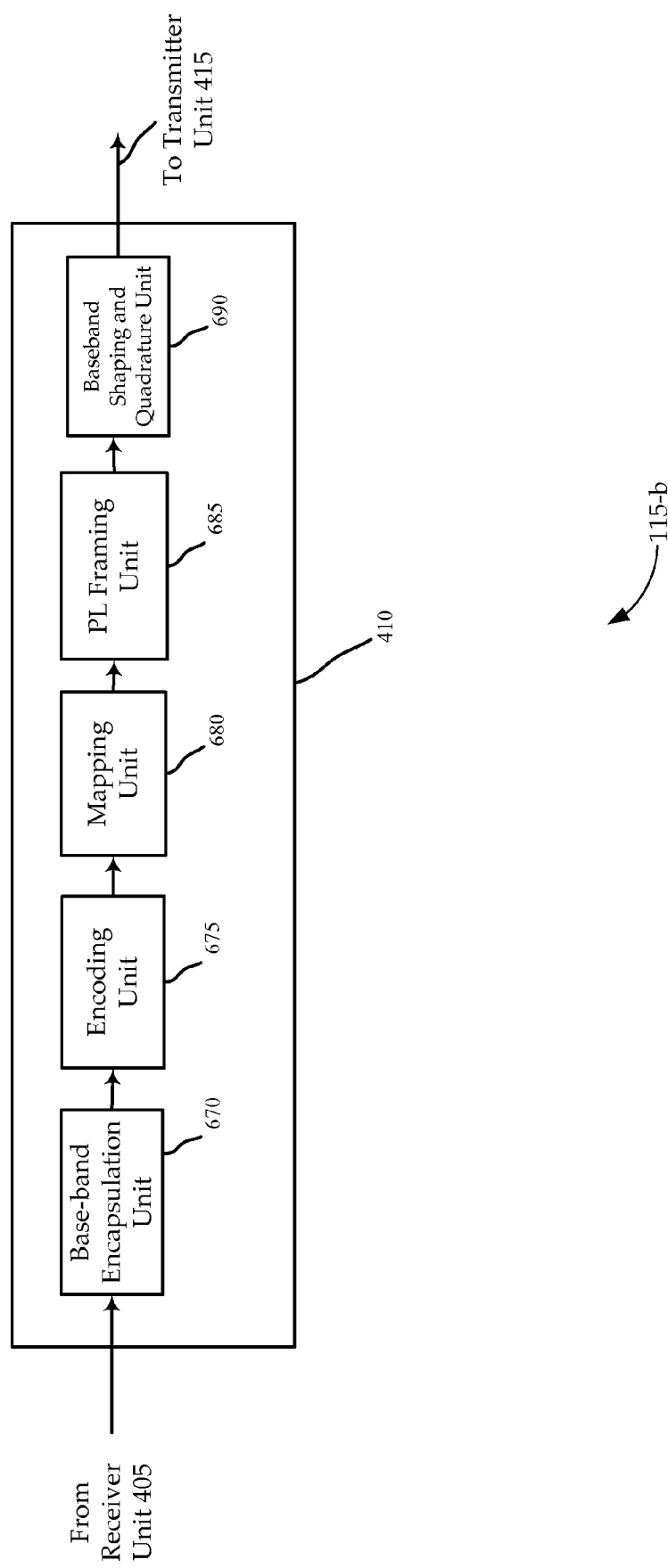
FIG. 6B is a block diagram of a processing unit in a gateway according to various embodiments of the invention.

FIG. 6B is a block diagram illustrating an example of selected units of the processing unit 410 of the gateway 115-b of FIG. 4, configured to perform the formatting discussed with reference to FIG. 6A. In this embodiment, the processing unit 410 includes a base-band encapsulation unit 670, an encoding unit 675, a mapping unit 680, a PL framing unit 685, and a baseband shaping and quadrature unit 690. For purposes of this description, assume the system 100 of FIG. 1, utilizing the single carrier ACM waveform transmitted downstream to a subscriber terminal 130 from a gateway 115-b. It is, nonetheless, worth noting that in different embodiments, the encapsulation and modulation techniques described above may be undertaken by a range of components.

In one embodiment, PL frames 665 (and, thus, each corresponding base-band frame 620 encapsulated therein) are mapped one for one for each sub-channel. Thus, it will be worthwhile to introduce certain principles related to sub-channel assignment and allocation, while noting that these will be developed in FIGS. 7-9. Consider that gateway 115-b has received and encapsulated data destined for a subscriber terminal 130. For purposes of discussion, a set of frames for transmission to a particular subscriber terminal 130 receiving a first sub-channel are designated (PLF1$_a$, PLF1$_b$, PLF1$_c$, . . . PLF1$_n$). Assume that there are eight sub-channels. In one embodiment, a round-robin technique is used where a first frame (PLFL1$_a$) is mapped to the first sub-channel, a second frame (not destined for the terminal) is mapped to a second-sub channel, and so on up to an eighth frame for an eighth sub-channel. The second frame destined for the terminal (PLF1$_b$) is then mapped to the first sub-channel, and the round-robin format proceeds (i.e., PLF1$_c$, . . . PLF1$_n$ are each mapped to the first sub-channel in succession after each round). In this embodiment, each sub-channel corresponds to a set of subscriber terminals 130.

A number of other techniques of mapping frames to sub-channels may be used as well. For example, instead of a round-robin format, the sub-channel identifiers may be appended without the recurring order (e.g., based on the bandwidth requirements, or QoS, of the terminals for the sub-channel). Thus, allocation and assignment of sub-channels may be varied dynamically (e.g., a given sub-channel identifier could be used for a number of consecutive frames, or the allocation to a given sub-channel may be greater that other sub-channels). A number of hybrid schemes are possible as well, as is evident to those skilled in the art, and thus a variety of multiplexing techniques may be used at the gateway.

In this embodiment, an IP packet is received from the network 120 by the receiver unit 405 of the gateway 115-b. After some initial processing, the base-band encapsulation unit 670 receives an encapsulated IP packet, and identifies the modcode to be used for the subscriber terminal to which the packet is directed. In one embodiment, the block size for the data field 610 and padding 615 is fixed according to the DVB-S2 standard. In another embodiment, the base-band encapsulation unit 670 may look up the appropriate block size for the data field 610 and padding 615, to thereby produce a physical layer frame 665 that will be a constant duration relative to other physical layer frames 665. Note that this duration may be fixed (permanent or semi-permanent), or may be varied dynamically to account for traffic composition or other factors.

The base-band encapsulation unit 670 encapsulates the received packet in accordance with the applicable block size, to produce a base-band layer frame 620, including a base-band header 605, a data field 610, and padding 615. Data in the data field includes the IP packet. An encoding unit 675 encodes the packet in accordance with the applicable coding (e.g., using BCH and LDCP) appending parity bits (630, 635) to produce an encoded frame 640. (e.g., FECFRAME 640). The encoded frame 640 then proceeds to the mapping unit 680, which maps the contents of the frame 640 to the constellation of the applicable modulation format to produce a frame 645 made up of symbols representative of the encoded frame 640 contents. An encoded physical layer header indicative of the modcode used and including a sub-channel identifier (e.g., a modified PLHEADER 650) is added by a PL framing unit 685 to produce a physical layer frame 665. The physical layer frame 665 is then baseband shaped and separated into in-phase and quadrature components by the baseband shaping and quadrature unit 690, and then processed by one or more amplifiers and an upconverter at the transmitter unit 415 to be transmitted as a downstream broadcast signal 135. This signal may be broadcast downstream 135, 150 through the satellite 105, to the subscriber terminals 130.

Figure 7:
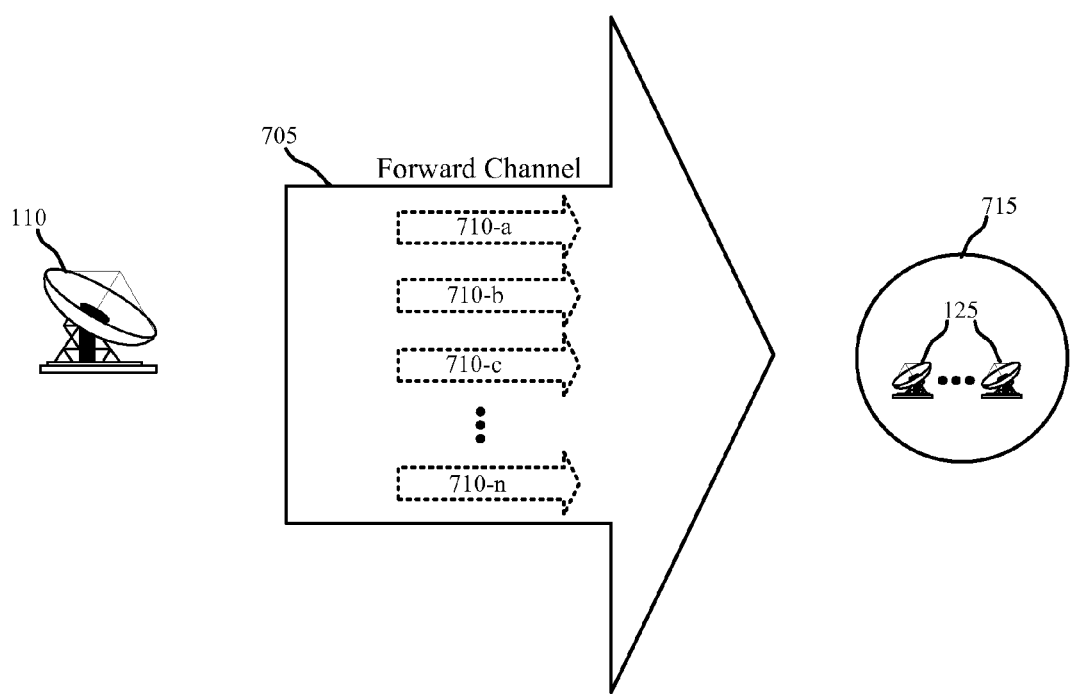
FIG. 7 is channel diagram of a downstream channel diagram according to various embodiments of the invention.

Referring next to FIG. 7, a forward channel diagram 700 illustrating the sub-channel structure is shown for an embodiment of the invention. The illustrated channel 705 goes from a gateway antenna 110 to the subscriber terminal antennas 125 in a service beam area 715. The forward channel 705 operates at approximately 500 Mbps in this embodiment such that a service beam area 715 receives that bandwidth, but in other embodiments could be at or above 100 Mbps, 250 Mbps, 750 Mbps, 1 Gbps, or 1.5 Gbps. A single carrier is used for transporting the forward channel 705, but other embodiments could use multiple carriers. The subscriber terminal 130 for this embodiment tracks at full rate (e.g., 500 Mbps), but does not completely demodulate and decode at full rate. Full demodulation and decoding only occurs for assigned sub-channels 710 in the forward channel 705.

In this embodiment, the forward channel 705 is shown as an arrow encapsulating n dashed arrows, which are the n sub-channels 710. The sub-channels 710 may each be portions of the superframe. In one embodiment, the duration in time of the superframe does not change, but the size of the superframe varies in other embodiments. A recurring block size for each frame of a sub-channel 710 may be the same, or frames may vary in number and size. Some embodiments do not use superframes, but simply have sub-channels that are addressed to sets of subscriber terminals 130.

Subscriber terminals 130 may be configured to be capable of processing different amounts of the forward channel 705. Some embodiments of the subscriber terminal 130 may be configured to process at $\frac{1}{16}$ datarate, $\frac{1}{8}$ datarate, $\frac{1}{4}$ datarate, $\frac{1}{2}$ datarate, full speed or any other fraction of the full data rate. In some cases, the subscriber terminal 130 may be configured to be incapable of running beyond a specified fraction of the full rate or artificially capped even though capable of faster speeds.

Figure 8A:
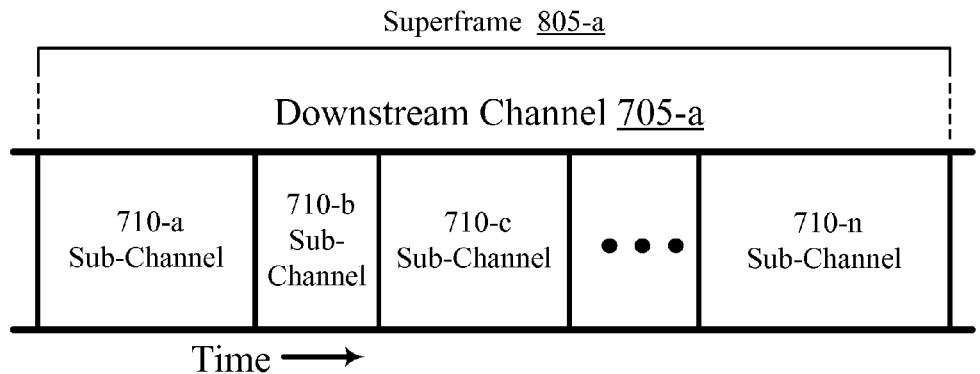
FIGS. 8A-8C are diagrams of various channel and sub-channel structures formatted according to embodiments of the invention.
Figure 8B:
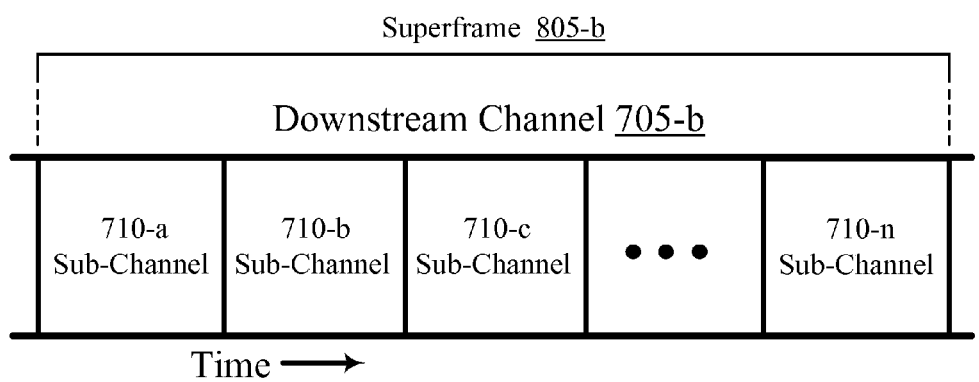
Figure 8C:
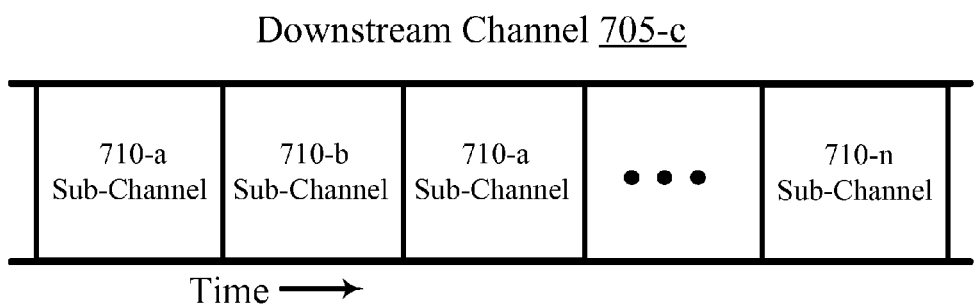
Figure 9A:
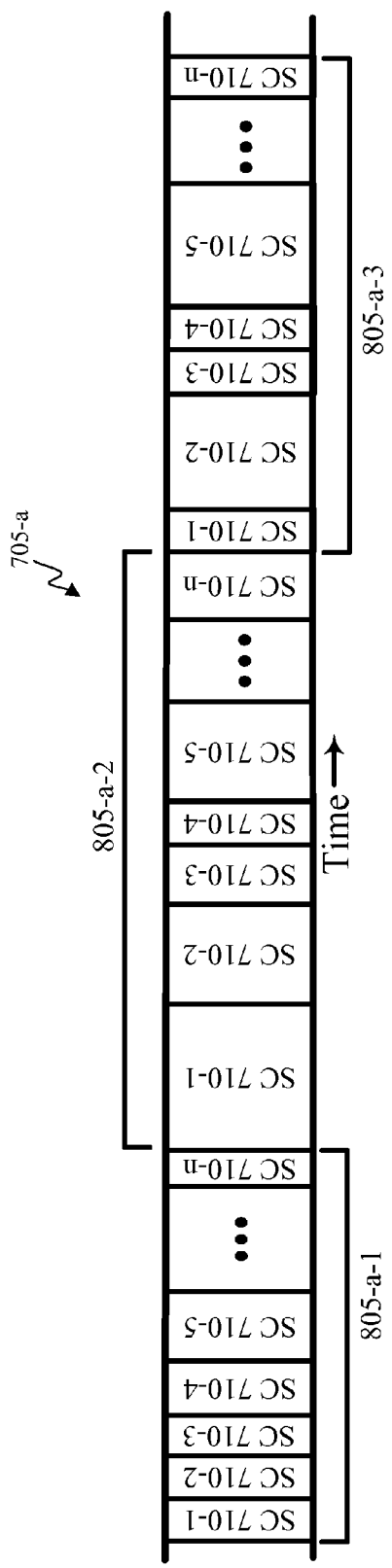

FIGS. 8A-8C illustrate various options for different embodiments of the channel 705. Referring first to FIG. 8A, an embodiment of a downstream channel 705-*a* is shown. This embodiment uses sub-channels 710 of a uniform block size in each superframe 805-*a*, and because of ACM, the duration in time of each sub-channel (and thus each frame) may vary. Thus, although the duration in time of each superframe will often vary in this embodiment, the number of frames and order of frames within each superframe will be constant.

Referring next to FIG. 8B, an alternative embodiment of a downstream channel 705-*b* is shown. This embodiment uses sub-channels 710 of a varied block size in each superframe 805-*b*, adapting block size in light of the applicable modcode, to produce sub-channels (and frames) of substantially uniform duration in time. Thus, the data size of each superframe will likely vary in this embodiment, but the number of frames per superframe 805-*b* and the order of sub-channels within each superframe 805-*b* will be constant. In other embodiments, a superframe 805 could be of constant duration in time, and the number of frames per superframe 805 and order of sub-channels within in each superframe 805 could vary.

Referring next to FIG. 8C, an alternative embodiment of a downstream channel 705-*c* is shown. This embodiment uses sub-channels 710 of a varied block size, adapting block size in light of the applicable modcode, to produce frames of substantially uniform duration in time. However, in this embodiment, there is no superframe, and the order of sub-channels 710 may vary. In one embodiment, the sub-channels may be in any order. In other embodiments, the system could be set to have certain times slots for selected sub-channels, or have individual sub-channels not repeat more often than a certain threshold (e.g., more than 1 in 2, or 1 in 3 frames).

FIGS. 9A-9F illustrate various alternatives for embodiments of the channel 705, sub-channels 710, and superframe formats. Referring first FIG. 9A, the channel 705-*a* described with reference to FIG. 8A is shown with a number of successive superframes 805-*a*. As noted above, this embodiment uses sub-channels 710 of a uniform block size (e.g., according to the DVB-S2 standard) in each superframe 805-*a*, so the duration in time of each sub-channel (and thus each frame) may vary. Thus, although the duration in time of each superframe will often vary in this embodiment, the number of frames and order of frames within in each superframe will be constant.

Figure 9B:

Referring next to FIG. 9B, an example of the channel 705-*b* described with reference to FIG. 8B is shown with a number of successive superframes 805-*b*. As noted above, this embodiment uses sub-channels 710 of different block sizes, adapting block size in light of the applicable modcode to produce sub-channels (and frames) of substantially uniform duration in time. Thus, the data size of each superframe 805-*b* will likely vary in this embodiment, but the number of frames and the order of sub-channels within each superframe 805-*b* will be constant.

Figures 9C, 9D:
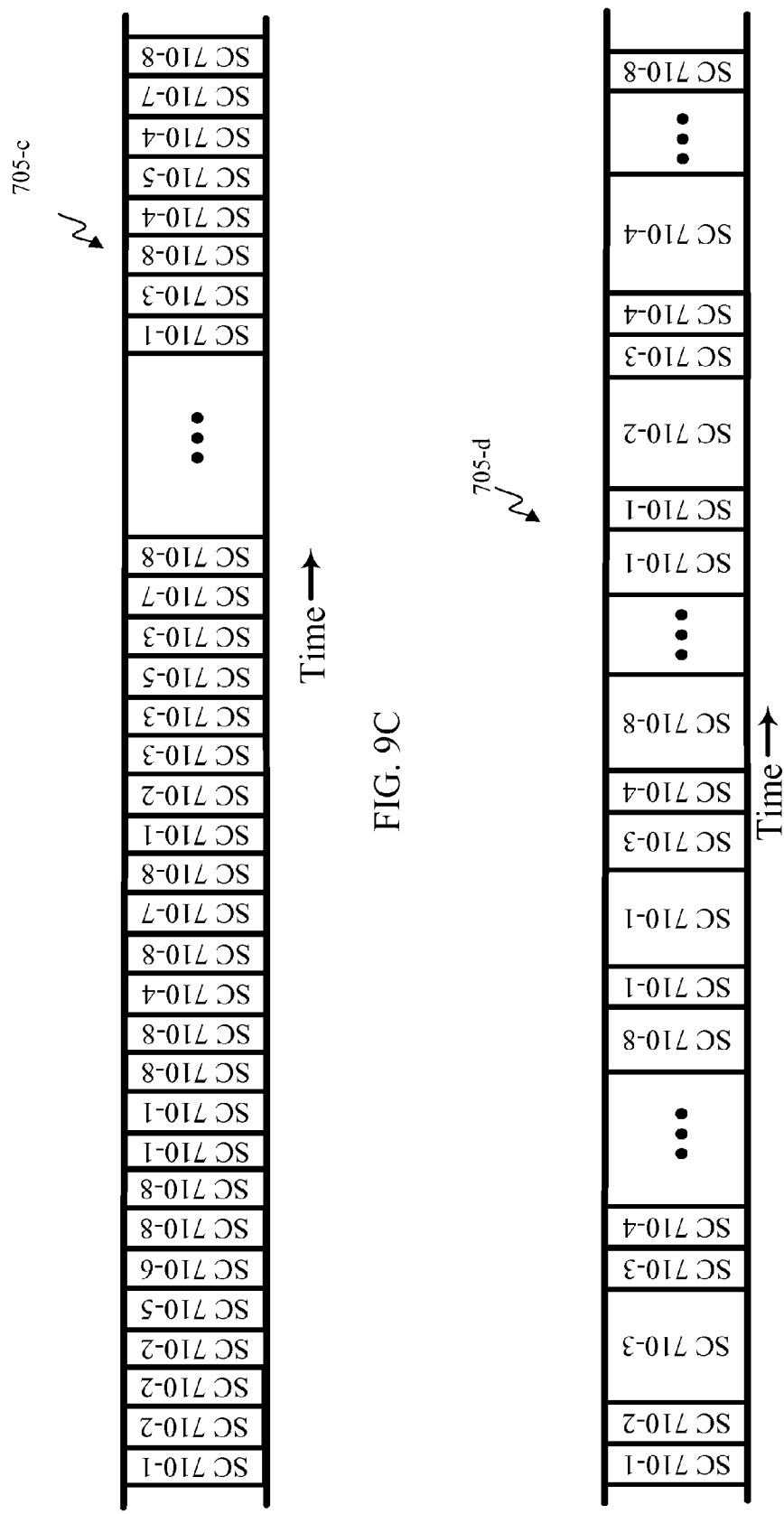

Referring next to FIG. 9C, an example of the channel 705-*c* described with reference to FIG. 8C is shown. As discussed above, there are no superframes 805 in this embodiment. This embodiment uses sub-channels 710 of a varied block size, adapting block size in light of the applicable modcode, to produce frames of substantially uniform duration in time. As shown, the order of sub-channels 710 may vary.

A number of other alternatives may be used, as well. For example, FIG. 9D is an example of the channel 705-*d* where there are no superframes 805. The order of sub-channels 710 may vary. This embodiment uses sub-channels 710 of a uniform block size (e.g., according to the DVB-S2 standard). Thus, the duration in time of each frame will often vary in this embodiment. FIG. 9E is an example of the channel 705-*e* where there are superframes 805-*e* of constant duration in time. The order of sub-channels 710 and number of frames in each superframe 805-*e* may vary. This embodiment uses sub-channels 710 of a uniform block size (e.g., according to the DVB-S2 standard). Thus, the duration in time of each frame will often vary in this embodiment, so the frames 710 in each superframe 805-*e* may have to be varied to produce superframes 805-*e* of constant duration in time. FIG. 9F is an example of the channel 705-*f* where there are superframes 805-*f* of constant duration in time. The order of sub-channels 710 and number of frames in each superframe 805-*f* may vary. This embodiment uses sub-channels 710 of different block sizes, adapting block size in light of the applicable modcode to produce sub-channels (and frames) of substantially uniform duration in time within each superframe 805. However, the duration in time of each frame will vary across superframes in this embodiment, so the number of frames 710 in each superframe 805-*f* may have to be varied to produce superframes 805-*f* of constant duration in time. Those skilled in the art will recognize the range of options available.

Figure 10:
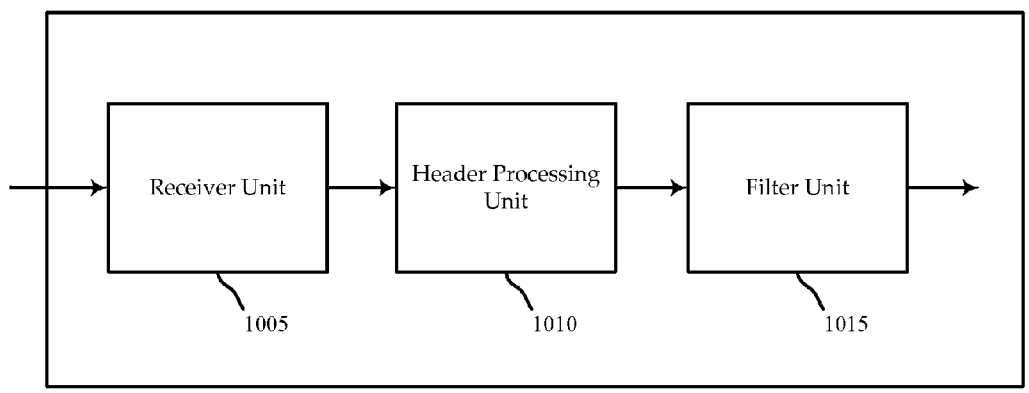
FIG. 10 is a block diagram of a subscriber terminal configured according to various embodiments of the invention.

Referring next to FIG. 10, an embodiment of a subscriber terminal 130-*b* (e.g., the subscriber terminal 130 of FIG. 1) is shown in block diagram form. In this embodiment, the subscriber terminal 130-*b* includes a receiver unit 1005, a header processing unit 1010, and a filter unit 1015, each in communication with each other directly or indirectly. These units of the device may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each unit may include memory, or accessed memory may be elsewhere on or off the terminal 130. In one embodiment, the header processing unit 1010 and filter unit 1015 make up a single processor.

The receiver unit 1005 may be configured to receive a wireless signal transmitted via a satellite. This may, for example, be the signal transmitted from the gateway 115 through the satellite 105 as described with reference to FIGS. 1 and 4, received via the subscriber terminal antenna 125. The receiver unit 1005 may downconvert and digitize the signal. In digitizing the received signal, the receiver may continue to perform symbol timing recovery and course carrier frequency recovery before demodulation. The digitized signal may be forwarded by the receiver unit to the header processing unit 1010. The header processing unit 1010 may, therefore, receive a digitized physical layer signal representative of the received wireless signal. This digitized stream may be made up of in-phase and quadrature components. The header processing unit 1010 may process the digitized stream to detect a first header identifier identifying a first header portion of the digitized stream. The header processing unit 1010 may then demodulate and decode the first header portion to identify a first sub-channel identifier for a physical layer payload associated with the first header portion.

A filter unit 1015 is configured to store one or more sub-channel identifiers (for example, sub-channel identifiers such as those in the signaling data 515 of FIG. 5 or the modified PLSCODE of FIG. 6A), the stored sub-channel identifiers indicating whether physical layer payload associated with the particular sub-channel identifier is to be demodulated and decoded by the subscriber terminal 130-b. The filter unit 1015 may include the memory storing the information, or may access external or other on-chip memory. The filter unit 1015 may determine that the first sub-channel identifier matches one or more of the stored identifiers indicating that an associated physical layer payload should be filtered before further demodulation and decoding. The filter unit 1015 may then filter the physical layer payload associated with the first header portion to prevent demodulation and decoding.

The header processing unit 1010 in some embodiments may be further configured to demodulate and decode a later, second header portion of the digitized stream to detect a second sub-channel identifier for a physical layer payload associated with the second header portion. In such embodiments, the filter unit 1015 is further configured to determine that the second sub-channel identifier matches one or more of the stored identifiers indicating that an associated physical layer payload is to be demodulated and decoded. The filter unit 1015 may forward the physical layer payload associated with the second header portion for demodulation and decoding.

For purposes of further explanation as to how the subscriber terminal 130-b may be configured, assume an embodiment where the sub-channels are numbered 1-8 (e.g., see FIG. 9B and discussion thereof). In this embodiment, a round-robin technique is used where a first frame (with a first sub-channel identifier) is mapped to a first sub-channel, a second frame (with a different sub-channel identifier) is mapped to a second sub-channel, and so on up to an eighth frame for an eighth virtual channel. A next frame (with the first sub-channel identifier) is then mapped to the first virtual channel, and the round-robin format proceeds, 1-8, 1-8, 1-8, mapping one physical layer frame per sub-channel. A physical layer header (e.g., physical layer header 505 of FIG. 5) may be demodulated, decoded, and processed by the header processing unit 1010 to extract the sub-channel identifier. This sub-channel identifier may be used to indicate the location of the desired frame relative to the current frame. For example, if a sub-channel identifier is number 7, and the desired sub-channel is number 1, the header processing unit 1010 may simply jump through two (or 10, or 18) frame periods.

A number of additional identifiers are possible at any of the different layers to allow for additional filtering at the subscriber terminal 130-b. In some embodiments, the physical layer frames are mapped 2:1, 3:1, 4:1 etc., to each sub-channel. Also, physical layer frames may be mapped with no (or, perhaps, less) pattern or regularity to a sub-channel slot, allowing increased or decreased bandwidth to be allocated to respective sub-channels. Physical layer frames may be mapped adaptively to open virtual channel slots. In various embodiments, information indicative of the number of frames between "relevant" frames may (but need not) be included, for example, in a physical layer header. Thus, the subscriber terminal 130-b may be configured or configurable to receive these different types of frame formats.

Under the DVB-S2 standard employing fixed block sizes, a subscriber terminal 130-b jumps through physical layer headers to the next "relevant" frame. To determine where in time the next intermediate frame header is located, a physical layer header is demodulated and decoded by the header processing unit 1010 so that the frame duration, structure, and modcode may be identified. Intermediate physical layer headers may therefore need to be demodulated, as well, given that the durations in time between frames may vary. The number of frames between "relevant" frames may be known by the receiving subscriber terminal 130-b, or communicated with a frame itself.

With CCM, or in certain modified DVB-S2 and other systems, frames are produced which are of constant duration across a series of different frames. The subscriber terminal 130-b may not need to decode each physical layer header in such systems, because the time between frames may be configured to remain constant. Thus, instead of jumping through each header, such systems would allow intermediate headers to be passed over. Aspects of the formatting and processing of such frames are discussed in greater detail with reference to FIGS. 15-24. However, it is worth noting that in such systems, each physical layer header may continue to be demodulated and decoded in some embodiments.

Figure 11:
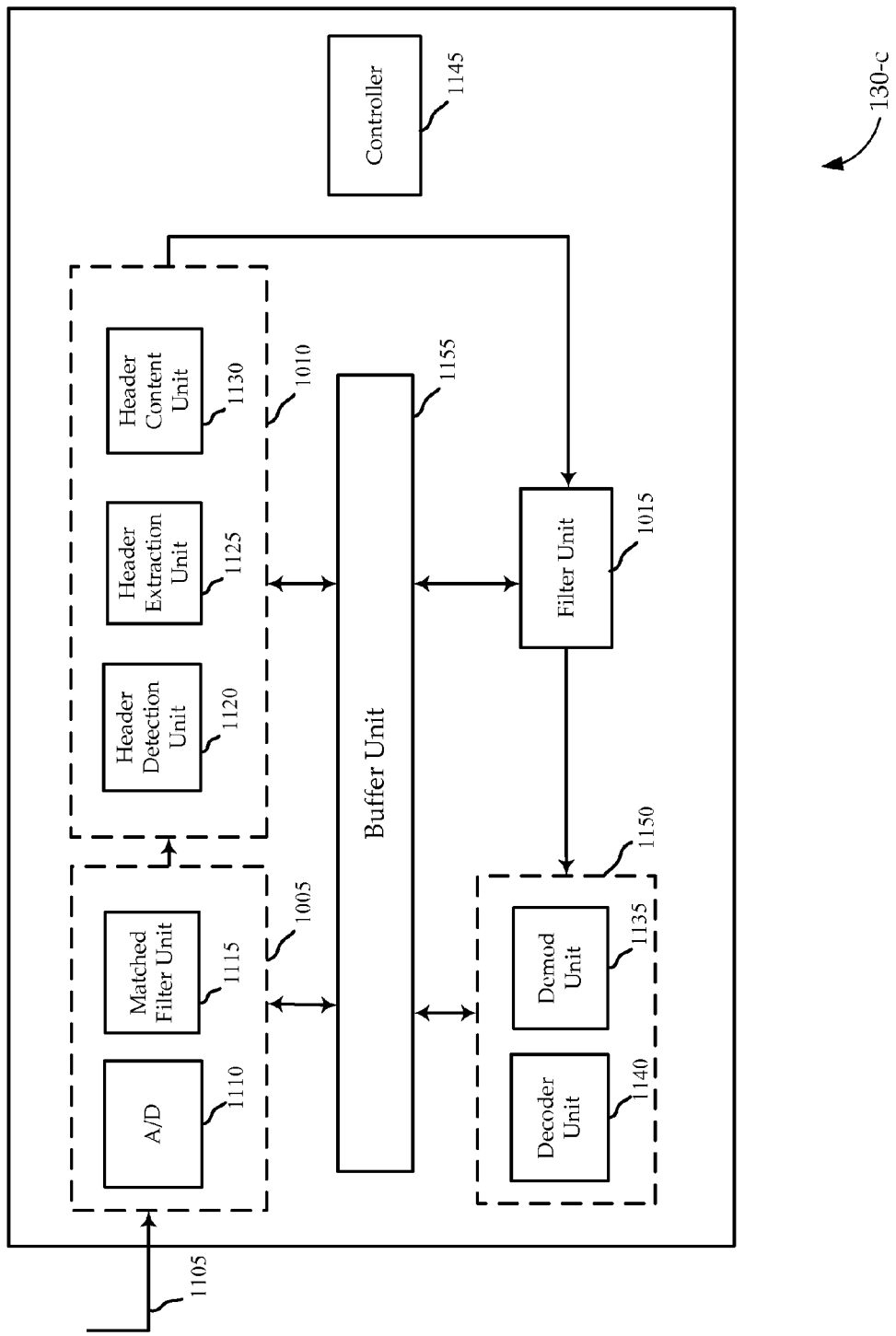
FIG. 11 is a block diagram of an alternative configuration for a subscriber terminal according to various embodiments of the invention.

Referring next to FIG. 11, an embodiment of a subscriber terminal 130-c (e.g., the subscriber terminal 130 of FIG. 1 or 10) is shown in block diagram form. In this embodiment, the subscriber terminal 130-c again includes a receiver unit 1005, a header processing unit 1010, and a filter unit 1015, which may be implemented as described with reference to FIG. 10. Each of these units, and their components, may be in communication with each other directly or indirectly. Particular components of each unit are also illustrated, and will be discussed in greater detail below, although other embodiments may include different combinations of such components. The subscriber terminal 130-c is configured to receive a wireless signal 1105 transmitted via a satellite 105. This may, for example, be the signal transmitted from the gateway 115 through the satellite 105 as described with reference to FIG. 1, 4 or 10, received via the subscriber terminal antenna 125.

In one embodiment, the signal received by the subscriber terminal 130-c is a waveform (e.g., a modified DVB-S2 waveform) operating as a single carrier with time slots (sub-channels) allocated to frames. Each frame may be broadcast with a sub-channel identifier in the physical layer header allowing the subscriber terminal 130-c to filter out inapplicable sub-channels before the frame payloads are demodulated and decoded.

The receiver unit 1005 may include an A/D unit 1110 and a matched filter unit 1115. The A/D unit 1110 may be configured to digitize the received signal (which may have already been amplified and downconverted), and may output a stream of data including in-phase and quatrature components. The matched filter unit 1115 (e.g., an interpolating filter) may further process and equalize the stream of data to produce, for example, a one sample per symbol stream.

The digitized stream produced by the matched filter unit 1115 is representative of a received series of physical layer frames, the frames including a physical layer header with a header identifier and a sub-channel identifier. For purposes of discussion hereinafter, assume that unless otherwise indicated, the frames being processed by the subscriber terminal 130-c are in the frame format 500 of FIG. 5, including the physical layer header 505 and payload 520. This digitized stream is forwarded from the matched filter unit 1115 to the header processing unit 1010, which includes a header detection unit 1120, a header extraction unit 1125, and a header content unit 1130.

The header detection unit 1120 may initially begin the processing by correlating the input signal (the digitized stream) with one or more known header identifiers. A header identifier 510 may be correlated with known identifiers and, thus, in the modified DVB-S2 embodiment, the SOF 655 of FIG. 6A may be correlated with known SOF patterns. The header identifier 510 may be used to estimate and remove phase and frequency errors. Thus, the header detection unit 1120 may process the digitized stream to detect a first header identifier identifying a first header portion and associated payload of the digitized stream. The physical layer header information (e.g., the signaling data 515 of FIG. 5 or modified PLSCODE 660 of FIG. 6A) may be extracted by the header extraction unit 1125, and the associated payload (e.g., payload 520 of FIG. 5 or XFECFRAME 645 of FIG. 6A) may be buffered by the buffer unit 1155.

The extracted physical layer header information may then be demodulated and decoded by the header content unit 1130. In doing so, the header content unit 1130 captures a first sub-channel identifier for the physical layer payload associated with the first header portion. The extracted physical layer header information may also provide the information on the modcode being used for the payload of the frame.

This captured sub-channel identifier may then be forwarded to the filter unit 1015, and the filter unit 1015 may access a listing of one or more sub-channel identifiers stored in a memory indicating whether the physical layer payload associated with each listed sub-channel identifier is to be demodulated and decoded. The filter unit 1015 may determine that the first sub-channel identifier matches one or more of the listed identifiers that indicate an associated physical layer payload is not to be demodulated and decoded. The filter unit 1015 may then filter the buffered physical layer payload associated with the first header portion to prevent the filtered payload from being demodulated or decoded by a demodulation and decoder unit 1150. For example, the buffer unit 1155 may be controlled to overwrite the stored part of the digitized stream including the physical layer payload before it is forwarded (or otherwise fetched) for demodulation or decoding.

Alternatively, the filter unit 1015 may determine that the first sub-channel identifier matches one or more of the listed identifiers indicating that an associated physical layer payload is to be demodulated and decoded. In this case, the buffered physical layer payload may be forwarded (or otherwise fetched) for processing to the demod unit 1135 and decoder unit 1140 for demodulation and decoding. The phase and frequency information from the processing performed by the header processing unit 1010 may be used by the demod unit 1135, and this information may be corrected using an adaptive frame-by-frame process. A controller 1145 may control a number of aspects of the data flow, and may control and further process the demodulated and decoded data (e.g., forwarding it to the CPE 160 of FIG. 1).

As noted above, in certain formats, the digitized stream includes a number of headers which are spaced substantially equidistant in time. This may be because of a dynamically assigned modcode in an ACM system, or perhaps because the system is operating with constant coding and modulation (CCM). In one set of embodiments, the header processing unit 1010 is further configured to process the digitized stream to allow other header identifiers identifying other header portions of the digitized stream to pass without detection, providing an additional avenue for filtering packets before demodulation and decode. In another set of embodiments, the header processing unit 1010 is further configured to omit a header identifier detection analysis for the digitized stream at one or more known header identifier locations after the first header portion. This may be because a given terminal operates on only one, or a subset, of the sub-channels (e.g., with a round-robin system). Alternatively, the formatting may be performed to ensure that a sub-channel identifier does not repeat more, for example, than one in two frames (or ⅓, ¼, ⅛, etc.). This is discussed further with reference to FIGS. 20-24, below. In other embodiments, other identifiers may be included in other layers (e.g., the BBHeader 605 of FIG. 6A) to further filter frames before additional processing.

In one embodiment, the demod unit 1135 and decoder unit 1140 are each configured to demodulate and decode only a subset of the physical layer payloads in the digitized stream. For example, in some embodiments, these units may be configured to demodulate and decode at most a fraction (e.g., ¼, ⅛, or 1/16) of the plurality of physical layer payloads in the digitized stream. While the foregoing description describes a range of embodiments, those skilled in the art will recognize that the description is for purposes of example only.

Figure 12:
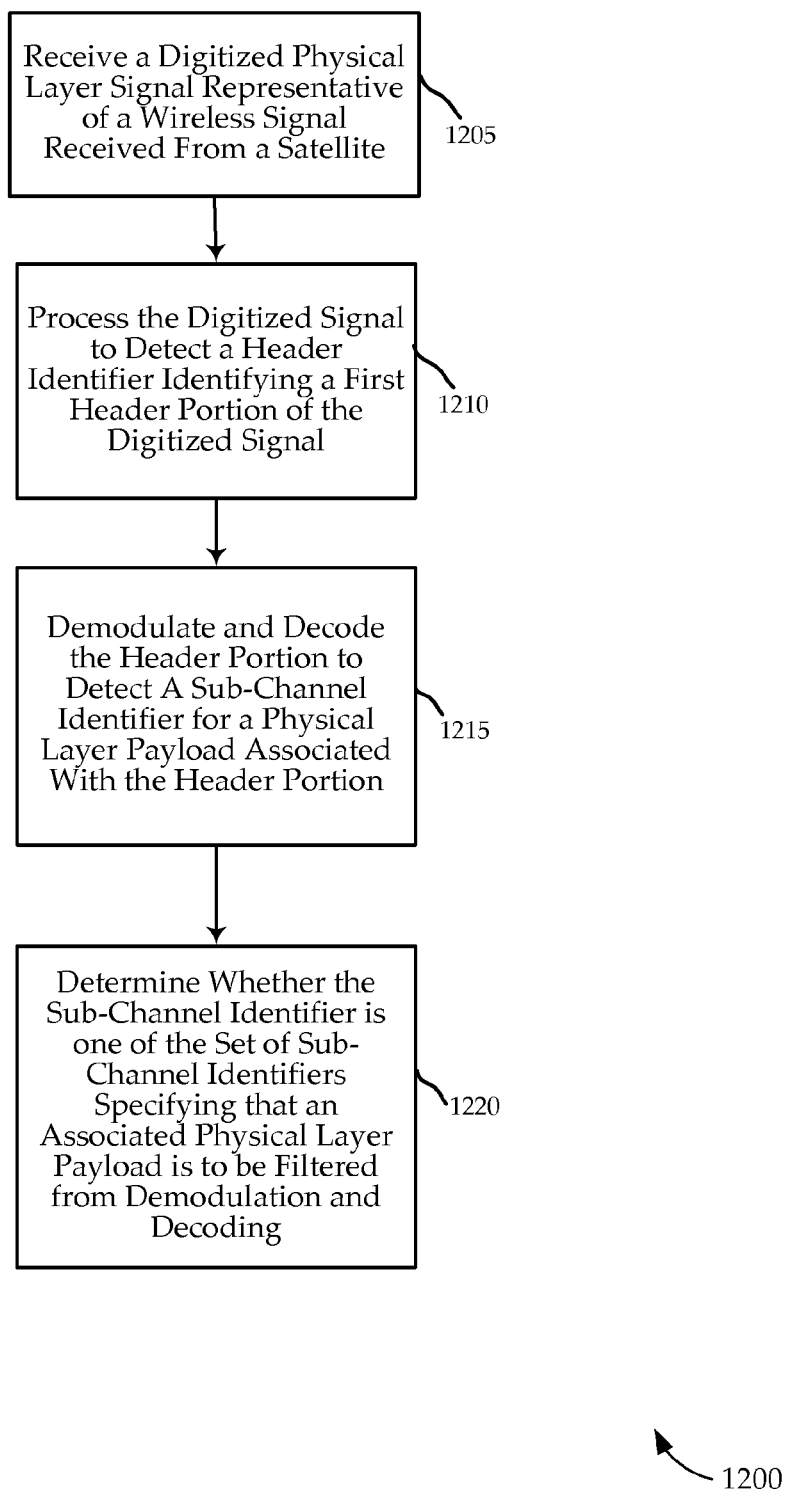
FIG. 12 is a flowchart illustrating a method for determining whether a payload associated with a physical layer header should be filtered from demodulation and decoding according to various embodiments of the invention.

Referring next to FIG. 12, a flowchart is shown illustrating a method 1200 for determining whether a payload associated with a physical layer header should be filtered from demodulation and decoding. The method may be performed, for example, in whole or in part, by the subscriber terminal 130 described with reference to FIG. 1, 10, or 11.

At block 1205, a digitized physical layer signal is received, the signal representative of a wireless signal received from a satellite. The wireless signal may be the satellite retransmission of the signal produced by the gateway 115-*b* as described with reference to FIG. 4. The digitized physical layer signal may be made up of the in-phase and quadrature components of the wireless signal. At block 1210, the received digitized signal is processed to detect a header identifier (e.g., the header identifier 510 of FIG. 5, or the SOF data 655 of FIG. 6A) identifying a first header portion of the digitized signal.

At block 1215, the identified first header portion is demodulated and decoded to identify a sub-channel identifier (e.g., included in the signaling data 515 of FIG. 5 or in modified PLSCODE 660 data of FIG. 6A) for a physical layer payload associated with the first header portion. At block 1220, a determination is made whether the identified sub-channel identifier is one of the set of sub-channel identifiers specifying that an associated physical layer payload is to be filtered from demodulation and decoding.

Figure 13:
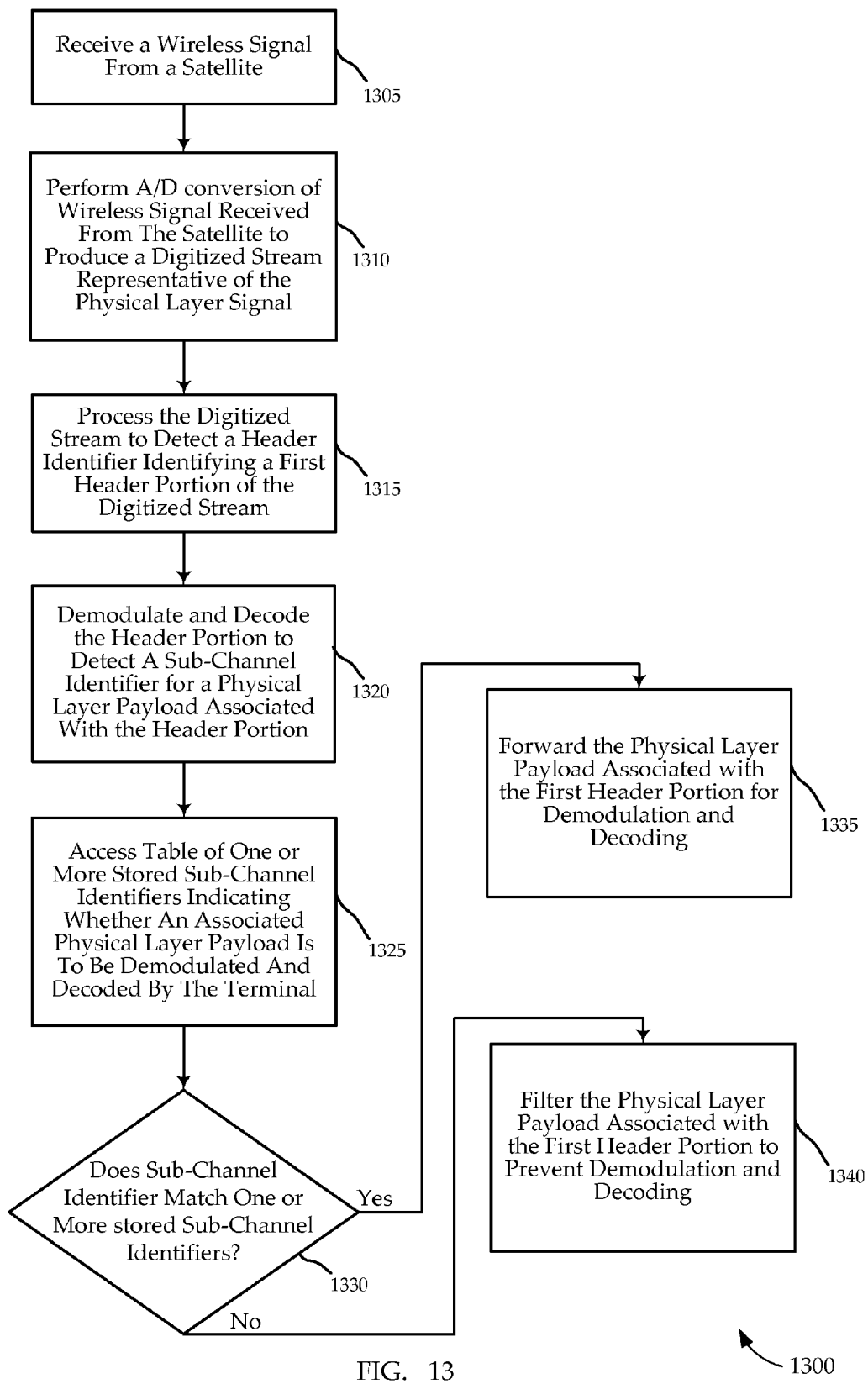
FIG. 13 is a flowchart illustrating an alternative method for determining whether a payload associated with a physical layer header should be filtered from demodulation and decoding according to various embodiments of the invention.

Referring next to FIG. 13, a flowchart is shown illustrating an alternative method 1300 for determining whether a payload associated with a physical layer header should be filtered from demodulation and decoding. The method may be performed, for example, in whole or in part, by the subscriber terminal 130 described with reference to FIG. 1, 10, or 11.

At block 1305, a wireless signal is received from a satellite (e.g., via an antenna 125). The wireless signal may be the satellite retransmission of the signal produced by the gateway 115-*b* as described with reference to FIG. 4. At block 1310, an analog-to-digital conversion is performed on a downconverted version of the wireless signal received from the satellite, to thereby produce a digitized stream representative of the physical layer signal. At block 1315, the digitized stream is processed to detect a header identifier identifying a first header portion of the digitized stream. The detected header identifier may be used to estimate and remove frequency and phase errors for the remainder of the header.

At block 1320, the remainder of the header portion is demodulated and decoded to detect a sub-channel identifier for a physical layer payload associated with the header portion. At block 1325, a table is accessed, the table including one or more stored sub-channel identifiers which indicate that a physical layer payload associated with the sub-channel identifier are to be demodulated and decoded. At block 1330, a determination is made whether the sub-channel identifier matches one or more stored sub-channel identifiers. If so, at block 1335 the physical layer payload associated with the first header portion is forwarded for demodulation and decoding.

If not, at block 1340 the physical layer payload associated with the first header portion is filtered to prevent demodulation and decoding.

Figure 14:
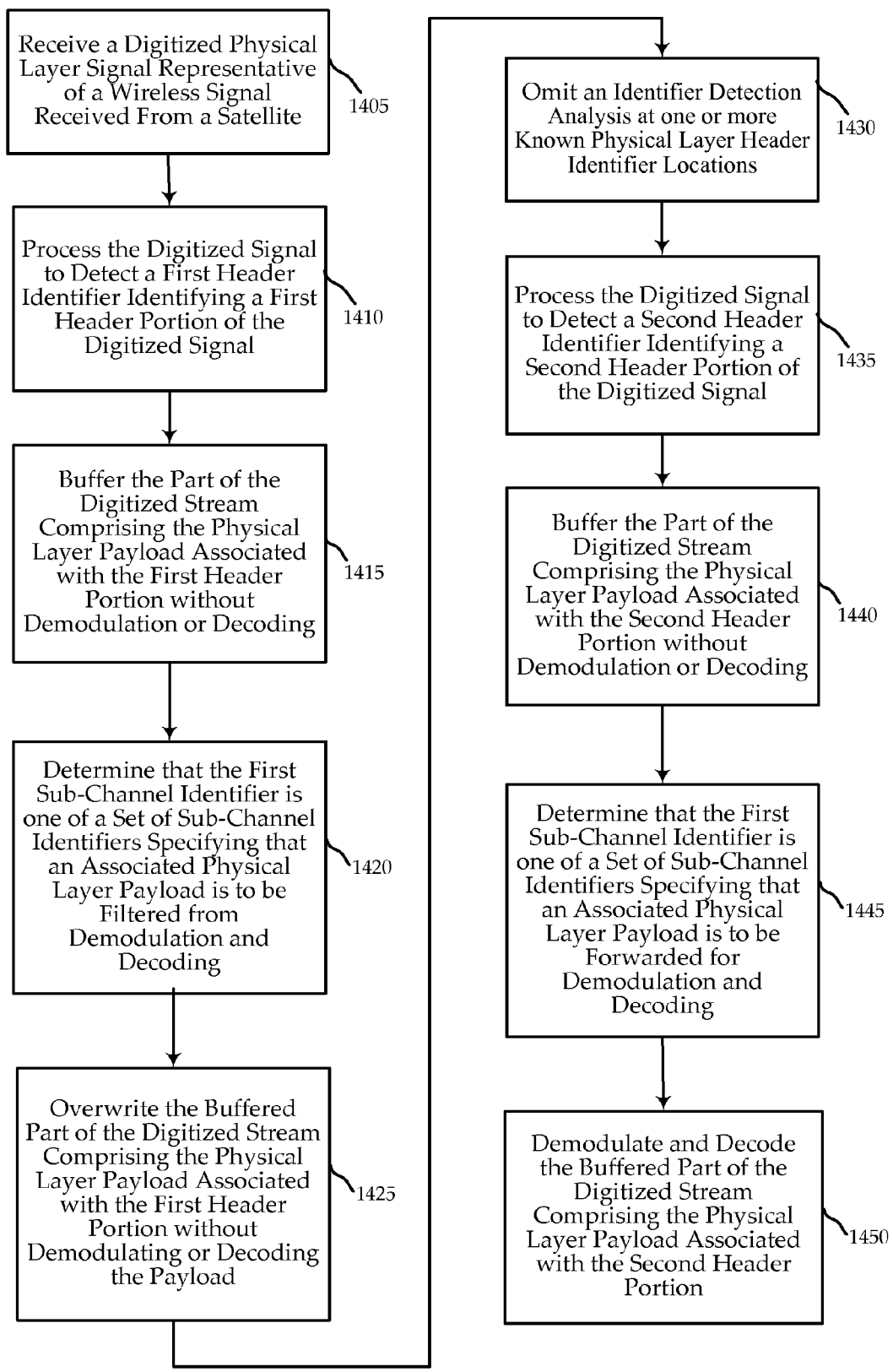
FIG. 14 is a flowchart illustrating yet another alternative method for determining whether a payload associated with a physical layer header should be filtered from demodulation and decoding according to various embodiments of the invention.

Referring next to FIG. 14, a flowchart is shown illustrating yet another alternative method 1400 for determining whether a payload associated with a physical layer header should be filtered from demodulation and decoding. The method may, for example, be performed in whole or in part by the subscriber terminal 130 described with reference to FIG. 1, 10, or 11.

At block 1405, a digitized physical layer signal representative of a wireless signal received from a satellite (e.g., the satellite retransmission of the signal produced by the gateway 115-*b* as described with reference to FIG. 4). At block 1410, the digitized signal is processed to detect a first header identifier identifying a first header portion of the digitized signal. At block 1415, the part of the digitized stream making up the physical layer payload associated with the first header portion is buffered without demodulation or decoding. The buffered signal may be stored as separate in-phase and quadrature samples.

At block 1420, a determination is made that the first sub-channel identifier is one of a set of sub-channel identifiers specifying that an associated physical layer payload is to be filtered from demodulation and decoding. At block 1425, the buffered part of the digitized stream making up the physical layer payload associated with the first header portion is overwritten without demodulation or decoding the payload. At block 1430, a header identifier detection analysis is omitted at one or more known physical layer header identifier locations. For example, the header identifier detection analysis may be omitted because the headers are spaced substantially equidistant in time so that header identifier locations are known. The sub-channel identifier may indicate that the payloads associated with the skipped header identifiers are not destined for the receiving terminal.

At block 1435, the digitized signal is processed to detect a second header identifier identifying a second header portion of the digitized signal. At block 1440, the part of the digitized stream making up the physical layer payload associated with the second header portion is buffered without demodulation or decoding. At block 1445, a determination is made that the first sub-channel identifier is one of a set of sub-channel identifiers indicating that an associated physical layer payload is to be forwarded for demodulation and decoding. At block 1450, the buffered part of the digitized stream making up the physical layer payload associated with the second header portion is demodulated and decoded.

Figure 15:
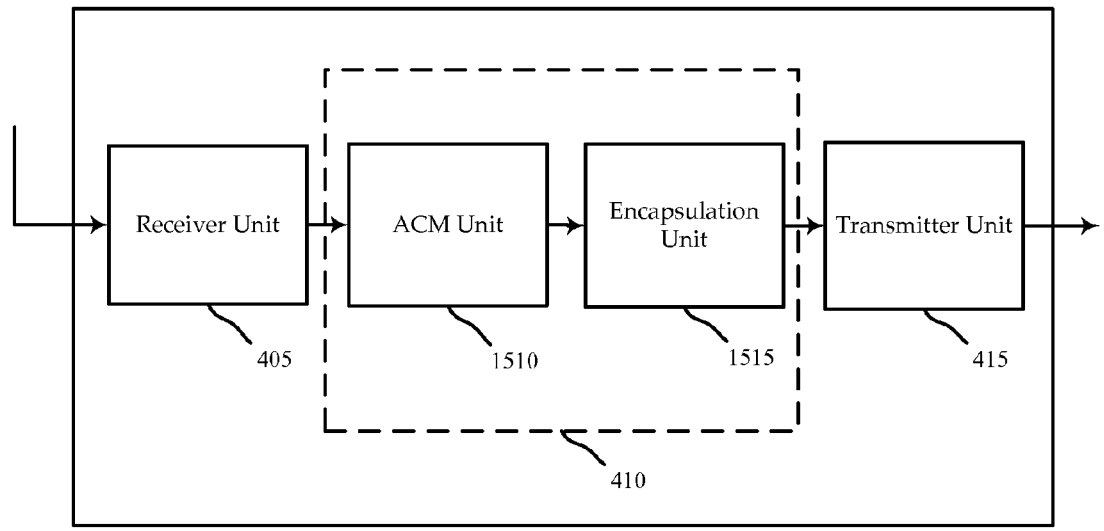
FIG. 15 is a block diagram of an alternative gateway configured according to various embodiments of the invention.

Referring next to FIG. 15, an embodiment of a gateway 115-*c* (e.g., the gateway 115 of FIG. 1 or FIG. 4) is shown in block diagram form. In this embodiment, the gateway 115-*c* again includes a receiver unit 405, a processing unit 410, and a transmitter unit 415, which may be implemented as described with reference to the gateway 115-*b* of FIG. 4. Each of these units may be in communication with each other directly or indirectly. Particular components of the processing unit 410 are also illustrated, namely an adaptive coding and modulation (ACM) unit 1510 and an encapsulation unit 1515. These components will be discussed in greater detail below, although other embodiments may include different combinations of components.

The receiver unit 405 may again be configured to receive a set of data (e.g., from the network 120) to be transmitted via the satellite 105 and destined for one or more subscriber terminals 130. The receiver unit 405 may also be configured to receive data identifying link conditions for the one or more subscriber terminals 130. This information may be transmitted from the subscriber terminals 130 to the gateway 115 via the upstream links 140, 145. Alternatively, the link conditions may be received from one or more devices on the network 120, that compile link condition information passed from the subscriber terminals 130 or other sources.

The adaptive coding and modulation unit 1510, in communication with the receiver unit 405, is configured to dynamically assign a modulation and coding format for the set of data based at least in part on the received link conditions. The encapsulation unit 1515, in communication with the receiver unit 410 and ACM unit 1510, may receive the assigned modulation and coding format for the set of data.

The encapsulation unit 1515 may use the assigned modulation and coding format to set a block size for the payload for a selected physical layer frame (e.g., frame 500 of FIG. 5 or PLFRAME 665 of FIG. 6A). The block size may be set so as to produce a physical layer frame of substantially equal duration in reference to other physical layer frames to be transmitted from the gateway 115-*c*. The encapsulation unit 1515 may then encapsulate a portion of the set of data in the set block size for the payload (e.g., the payload 520 of FIG. 5 or the XFECFRAME 645 of FIG. 6A) of the selected physical layer frame. The physical layer frame includes a physical layer header (e.g., physical layer header 505 of FIG. 5 or PLHEADER 650 of FIG. 6A). The physical layer header may also include a sub-channel identifier (e.g. the sub-channel identifier in the signaling data 515 of FIG. 5) formatted to allow subscriber terminal filtering.

The transmitter unit 415 is in communication with the encapsulation unit 1515, and is configured to receive the encapsulated physical layer frame, and upconvert and amplify the physical layer frame for transmission to the satellite. In one embodiment, the ACM unit 1510 and encapsulation unit 1515 are implemented as a single processor.

Figure 16A:
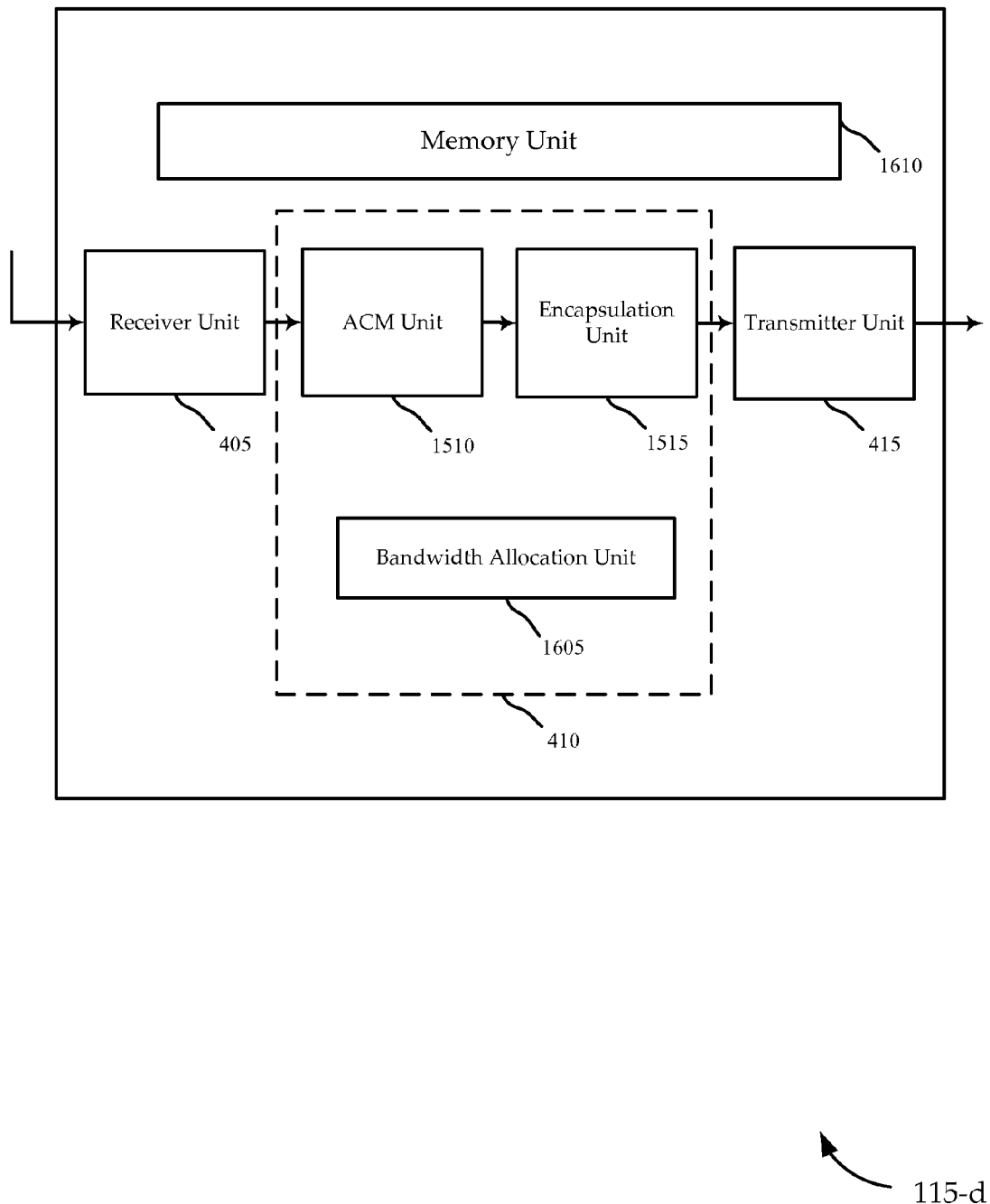
FIG. 16A is a block diagram of an embodiment of the alternative gateway configuration.

Referring next to FIG. 16A, an embodiment of a gateway 115-*d* (e.g., the gateway 115 of FIG. 1, 4, or 15) is shown in block diagram form. In this embodiment, the gateway includes a receiver unit 405, a processing unit 410, a transmitter unit 415, and a memory unit 1610, which may be implemented as described for the gateway 115 of FIG. 4 or 15. Each of these units, and their components, may be in communication with each other directly or indirectly. Particular components of the processing unit 410 are also illustrated, namely an adaptive coding and modulation (ACM) unit 1510, an encapsulation unit 1515, and a bandwidth allocation unit 1605. These components will be discussed in greater detail below, although as noted above other embodiments may include different combinations of components.

As in other embodiments, the receiver unit 405 may again be configured to receive a set of data (e.g., from the network 120) to be transmitted via the satellite 105 and destined for one or more subscriber terminals 130. The receiver unit 405 may also be configured to receive data identifying link conditions for the one or more subscriber terminals 130. This information may be transmitted from the subscriber terminals 130 to the gateway 115 via the upstream links 140, 145 of FIG. 1. Alternatively, the link conditions may be received from one or more devices on the network 120, that compile link condition information passed from the subscriber terminals 130 or other sources.

The received link condition information may, for example, be organized and stored in an address/link condition table, located in memory unit 1610. This table may be used by the ACM unit 1510 to lookup the signal quality of a subscriber terminal 130 to which a packet is destined, based on a destination address. A variety of address mechanisms may be used to identify particular subscriber terminals, including a destination MAC destination VLAN-ID, a Destination Internet Protocol ("DIP") address, a private addressing ID, sub-channel identifier, or any other set of data comprising or otherwise correlated with a destination address. The destination data address for data to be transmitted downstream 135, 150 may be parsed from a received data packet after arrival at the gateway 115, looked up in a routing table, or received in any other manner known in the art. It is also worth noting that a number of other data structures may also be used to relate an address to signal quality.

The memory unit 1610 may also store a modcode table (or other data structure associating signal quality and modcode). The modcode table may be accessed to determine the modcode to be used for packets destined for a subscriber terminal 130 operating in a given signal quality range. The table may contain a number of modcode formats, each corresponding to a specified signal quality range. Different modcode formats may have different codeword sizes, code rates, modulation schemes, and pilot insertions.

The ACM unit 1510, in communication with the memory unit 1610, is configured to dynamically assign a modulation and coding format for the set of data based at least in part on the received link conditions. In one embodiment, the ACM unit 1510 may access a address/link condition table and modcode table to associate a particular subscriber terminal 130 with a modcode. In other embodiments, a modcode may be set using other lookup tables, or may be received for another device local or remote to the gateway 115-d.

The encapsulation unit 1515 may use the assigned modulation and coding format to set a block size for the payload for a selected physical layer frame (e.g., frame 500 of FIG. 5). The block size may be set so as to produce physical layer frames of substantially equal duration in reference to other (e.g., adjacent) physical layer frames to be transmitted from the gateway 115-d. FIG. 16B shows an example of the length table 1650 that may be used to set the block size, although other formats may be used in other embodiments. Various modcodes 1655 are each associated with different block sizes 1660 (e.g., data size of the payload 520 of FIG. 5 or the data field 610 of FIG. 6A). The encapsulation unit 1515, knowing the modcode applicable to a frame, may access or query the table 1650 to identify the field lengths 1660 that will be needed to produce frames of constant duration (e.g., each frame including the same number of symbols), to address circumstances when different modcodes are being used. Although a simplified table 1650 is used to illustrate this embodiment, those skilled in the art will recognize the range of lookup tables and search mechanisms available.

The encapsulation unit 1515 may then encapsulate a portion of the set of data in the set block size for the payload (e.g., the payload 520 of FIG. 5) of the selected physical layer frame. The physical layer frame includes a physical layer header (e.g., physical layer header 505 of FIG. 5). The physical layer header may include a header identifier (e.g., header identifier 510 of FIG. 5 or SOF 655 of FIG. 6A) to allow the subscriber terminal to identify boundaries of the header and/or for the first physical layer frame. This may be achieved by performing the header identifier detection analysis described above (e.g., see the discussion of FIG. 5 describing the header identifier detection).

The physical layer header may also include a sub-channel identifier (e.g. the sub-channel identifier in the signaling data 515 of FIG. 5) formatted to allow subscriber terminal 130 filtering. As discussed previously, the sub-channel identifier may be formatted to provide information to allow a subscriber terminal 130 to identify whether the payload of physical layer frame is to be demodulated and decoded, or filtered to prevent the payload from being demodulated or decoded.

In one embodiment, the sub-channel identifier is formatted to provide information allowing a subscriber terminal 130 to omit a header identifier detection analysis at known header identifier locations in a set of physical layer frames received after the processed physical layer frame. By way of example, assume an embodiment wherein a given sub-channel will not repeat more than one in four frames (i.e., there are at least three frames between each frame with a same sub-channel identifier). In a format with known spacing in time between headers, header identifier detection analysis at certain known identifier locations may be omitted for the given sub-channel in the three subsequent frames after each "hit."

Moreover, a sub-channel identifier may be formatted to provide information allowing a subscriber terminal 130 to identify a location for a next header identifier detection analysis in a set of physical layer frames received after the first physical layer frame. Again, by way of example, in a round-robin format with known spacing in time between headers (e.g., the format of FIG. 9B), the sub-channel identifier may indicate the next applicable sub-channel header location because of the recurring order (perhaps skipping known intermediate locations). Thus, a recurring order, or a minimum spacing between two of the same sub-channel identifiers, may allow searching for sub-channel identifiers to be refined (by omitting or targeting certain header identifier detection analysis).

The physical layer header may also include other information. For example, data in the physical layer header may include different or supplemental information on spacing between the current header and the next or later headers for other physical layer frames. Data in the physical layer header may also dynamically signal a current or future change in the spacing between headers. Thus, the spacing between substantially equidistant physical layer headers may be changed.

In addition to the above functionality, the gateway 115-c may include a bandwidth allocation unit 1605 configured to dynamically vary a bandwidth for the respective subscriber terminals via assignment of the sub-channel identifier. To do so, the gateway 115-c or bandwidth allocation unit 1605 may determine an increased (or decreased) bandwidth requirement for a subscriber terminal 130 or set of subscriber terminals 130. After receiving and/or processing this information, the bandwidth allocation unit 1605 may increase (or decrease) a proportional allocation of physical layer frames including the sub-channel identifier associated therewith. Thus, from a finite pool of frames to be transmitted in a given period of time, the bandwidth allocation unit 1605 may increase or decrease the proportional allocation of frames including the sub-channel identifier. The bandwidth allocation unit 1605 may then control the encapsulation unit 1515 to generate the physical layer frames with the sub-channel identifier in the increased (or decreased) proportion. The increased of decreased proportion may be based on other factors, as well, such as quality of service priorities or class of service attributes.

The transmitter unit 415 is in communication with the encapsulation unit 1515, and is configured to receive the encapsulated physical layer frames, and upconvert and amplify the physical layer frame for transmission to the satellite. In one embodiment, the signal transmitted to the subscriber terminal 130 is a waveform (e.g., a modified DVB-S2 waveform) operating as a single carrier with time slots (sub-channels) allocated to frames. Each frame may be broadcast with a sub-channel identifier in the physical layer header allowing the subscriber terminal 130 to filter out inapplicable sub-channels before the frame payloads are demodulated and decoded.

The transmitted signal may, thus, include a series of physical layer frames with dynamically assigned modcodes. The block size of data for the payload of each of the frames in the signal may be set dynamically to produce physical layer frames of substantially equal duration. The frames in the signal may each include a physical layer header with a first sub-channel identifier formatted to allow subscriber terminal filtering of packets before the first payload is demodulated or decoded. In one embodiment, the ACM unit 1510, encapsulation unit 1515, and bandwidth allocation unit 1605 are implemented as a single processor.

Figure 17:
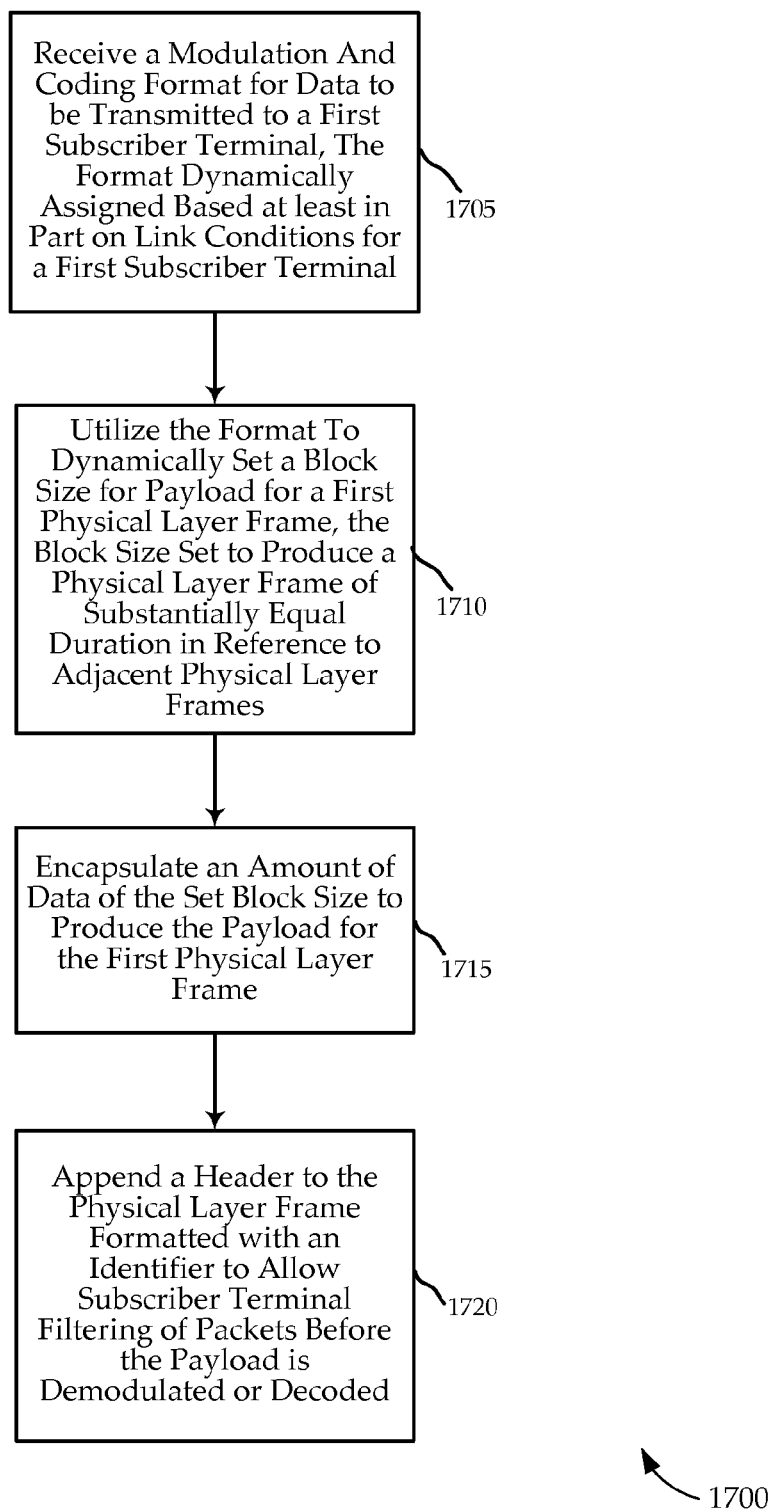
FIG. 17 is a flowchart illustrating a method for formatting data for a physical layer frame according to various embodiments of the invention.

Referring next to FIG. 17, a flowchart is shown illustrating a method 1700 for formatting data for a physical layer frame. The method may, for example, be performed in whole or in part by the gateway 115 described with reference to FIG. 15 or 16A, or by other gateway 115 configurations described herein (e.g., FIG. 1).

At block 1705, a modulation and coding format is received for data to be transmitted to a first subscriber terminal, the format dynamically assigned based at least in part on link conditions for a first subscriber terminal. The dynamic assignment may be made by another unit of the gateway 115 (e.g., an ACM unit), or an external device. At block 1710, the received format is used to dynamically set a block size for payload for a first physical layer frame, the block size set to produce a physical layer frame of substantially equal duration in reference to adjacent physical layer frames. This duration may be preset, or may be configurable.

At block 1715, an amount of data in the set block size is encapsulated to produce the payload for the first physical layer frame. At block 1720, a header is appended to the payload for the physical layer frame, the header formatted with a sub-channel identifier to allow subscriber terminal filtering of packets before the payload is demodulated or decoded. The physical layer frame may then be upconverted and amplified for transmission to a subscriber terminal 130 via a satellite 105.

Figure 18:
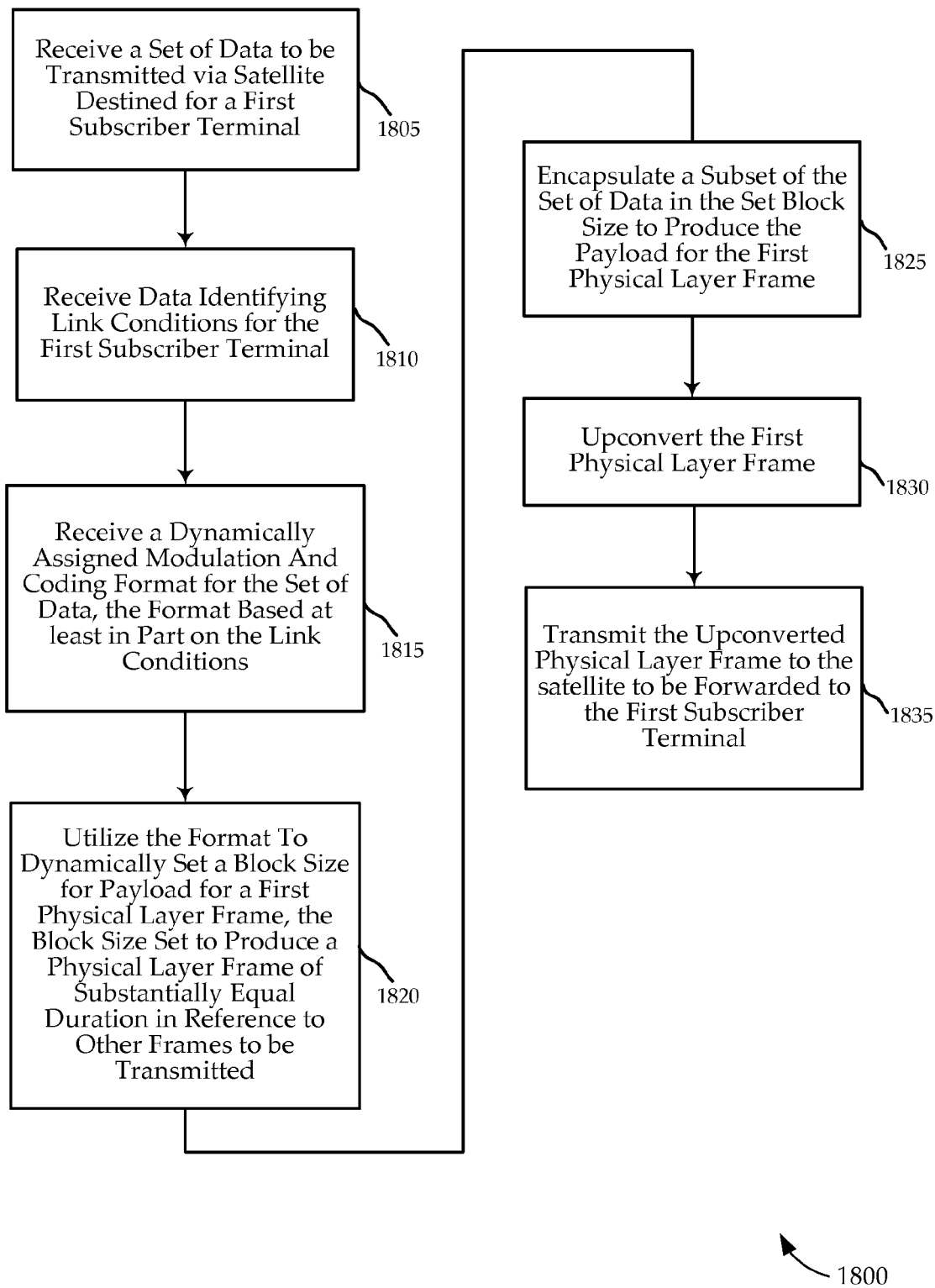
FIG. 18 is a flowchart illustrating an alternative method for formatting data for a physical layer frame according to various embodiments of the invention.

Referring next to FIG. 18, a flowchart is shown illustrating an alternative method 1800 for formatting data for a physical layer frame. The method may, for example, be performed in whole or in part by the gateway 115, described with reference to FIG. 15 or 16A, or by other gateway 115 configurations described herein (e.g., FIG. 1).

At block 1805, a set of data is received (e.g., from a network 120) to be transmitted via satellite to a first subscriber terminal. At block 1810, data is received (e.g., from the network 120 or from the first subscriber terminal) identifying link conditions for the first subscriber terminal. At block 1815, a dynamically assigned modulation and coding format is received for the set of data to be transmitted, the format based at least in part on the link conditions. At block 1820, the format is used to dynamically set a block size for payload for a first physical layer frame, the block size set to produce a physical layer frame of substantially equal duration in reference to other frames to be transmitted.

At block 1825, at least a subset of the set of data to be transmitted is encapsulated in the set block size to thereby produce the payload for the first physical layer frame. At block 1830, the first physical layer frame is upconverted, and at block 1835 the upconverted physical layer frame is transmitted to the satellite to be forwarded to the first subscriber terminal.

Figure 19:
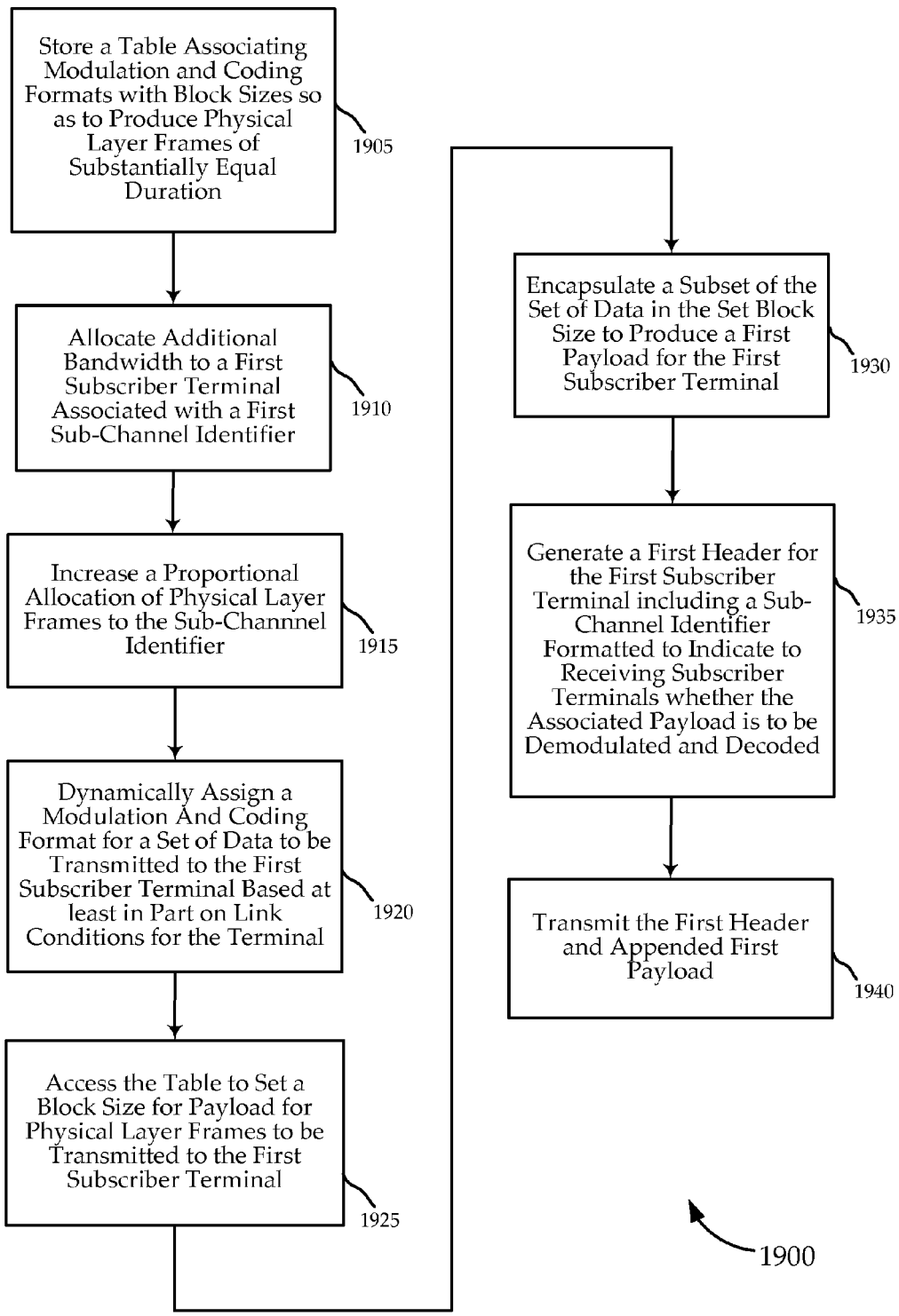
FIG. 19 is a flowchart illustrating yet another alternative method for formatting data for a physical layer frame according to various embodiments of the invention.

Referring next to FIG. 19, a flowchart is shown illustrating yet another alternative method 1900 for formatting data for a physical layer frame. The method may, again, be performed in whole or in part by the gateway 115, described with reference to FIG. 15 or 16A, or by other gateway 115 configurations described herein (e.g., FIG. 1).

As noted above, in some embodiments particular signal quality ranges at receiving devices (e.g., subscriber terminals 130) may be associated with certain modulation and coding formats (modcodes). At block 1905, a table is stored associating such modcodes with block sizes so as to allow for the production of physical layer frames of substantially equal duration. In addition to a table, other data structures may be used is other embodiments. At block 1910, additional bandwidth is allocated to a first subscriber terminal associated with a first sub-channel identifier. At block 1915, the proportional allocation of physical layer frames to the first sub-channel identifier is increased in response to the allocation of additional bandwidth.

At block 1920, a modulation and coding format is dynamically assigned for a set of data to be transmitted to the first subscriber terminal, the assignment based at least in part on link conditions for the terminal. At block 1925, the table is accessed to set a block size for payload for physical layer frames to be transmitted to the first subscriber terminal. At block 1930, at least some of the set of data to be transmitted to the first subscriber terminal is encapsulated in the set block size, to produce a first payload for the first subscriber terminal. At block 1935, a first physical layer header for the first subscriber terminal is generated with a sub-channel identifier formatted to indicate to receiving subscriber terminals whether the associated payload is to be demodulated and decoded. At block 1940, the first header and appended first payload are transmitted.

With the description of encapsulation and transmission of the signal related to FIGS. 15-19 largely completed, it is worth turning to a discussion of the reception of the signal at a subscriber terminal 130. Referring initially to FIG. 10, the signal transmitted from the gateway 115 (as described with reference to FIG. 1, 15, or 16B) may be received by the subscriber terminal 130-b of FIG. 10. Thus, the subscriber terminal 130-b may have all or any subset of the functionality described above with reference to FIG. 10, and any additional functionality as described below.

The receiver unit 1005 may be configured to receive a wireless signal transmitted via a satellite. This may, for example, be the signal transmitted from the gateway 115 through the satellite 105 as described with reference to FIG. 1, 4, 15, or 16A, received via the subscriber terminal antenna 125. The receiver unit 1005 may downconvert and digitize the signal. In digitizing the received signal, the receiver may continue to perform symbol timing recovery and course carrier frequency recovery before demodulation. The receiver unit 1010 may forward the digitized signal to the header processing unit 1010. The header processing unit 1010 may, therefore, receive a digitized physical layer signal representative of the received wireless signal. The digitized stream may include a number of physical layer headers (e.g., within each of a number of physical layer frames), the headers spaced substantially equidistant in time and each associated with a respective physical layer payload (e.g, as described for FIG. 1, 15, 16A, or 16B). The digitized stream may be made up of in-phase and quadrature components. The header processing unit 1010 may process the digitized stream to detect a first header identifier identifying a first header portion of the digitized stream. The header processing unit 1010 may demodulate and decode the first header portion to identify a first sub-channel identifier for a physical layer payload associated with the first header portion.

The header processing unit 1010 may determine a search location in the digitized stream for a second header identifier detection analysis. The header processing unit 1010 may omit a header identifier detection analysis in the digitized stream at one or more known header identifier locations between the first physical layer header portion and the search location. The determination of the search location and/or the omission of the header identifier detection analysis may be based on the first sub-channel identifier and the duration in time between headers, in addition to other factors.

The filter unit 1015 is configured to exclude from demodulation or decoding one or more physical layer payloads in the digitized stream associated with the omitted identifier detection analysis locations. The filter unit 1015 may also be configured to forward or otherwise allow demodulation or decoding for the physical layer payloads associated with the search location.

In one embodiment, the filter unit 1015 may determine whether the first sub-channel identifier is an identifier for payload to be filtered from demodulation and decoding. If so, the filter unit 1015 may identify the physical layer payload (perhaps stored in memory) associated with the first sub-channel identifier as data to be filtered to prevent demodulation and decoding. The filter unit 1015 may then filter the digitized stream to exclude the identified physical layer payload from demodulation or decoding. However, the filter unit 1015 may, in the alternative, identify the physical layer payload (perhaps stored in memory) associated with the first sub-channel identifier as data to be filtered to prevent demodulation and decoding. In that case, the identified physical layer payload may be forwarded (or otherwise fetched) for demodulation and decode.

Each of the series of physical layer headers spaced substantially equidistant in time may, therefore, include one of a number of sub-channel identifiers (e.g., in the signaling data 515 of FIG. 5 or PLSCODE 660 of FIG. 6A). One or more of the sub-channel identifiers may recur at a regular intervals in time in the digitized stream. Using this recurrence, the header processing unit 1010 may be configured to determine a future search location in the digitized stream for header identifier detection based on the regular interval. It is worth noting, however, that it is not necessary that any or all of the sub-channel identifiers recur at regular intervals in time. Instead, one or more sub-channels may be assigned in a more random manner, thereby allowing bandwidth to particular sub-channels to be allocated dynamically. In still other embodiments, there may be a hybrid scheme, where the header processing unit 1010 is configured to omit a header identifier detection analysis in known header identifier locations based at least in part on a minimum interval between same sub-channel identifiers.

As noted with reference to the discussion of FIGS. 15 and 16A, the spacing between the series physical layer headers may be configurable from a transmitter (e.g., the gateway 115 of FIG. 15A or 16). Therefore, the header processing unit 1010 may further be configured to receive data identifying modified spacing between the plurality of physical layer headers (e.g., from the gateway 115 of FIG. 15A or 16). The header processing unit 1010 may change spacing in time between each header identifier detection analysis to account for the modified spacing.

Figure 20:
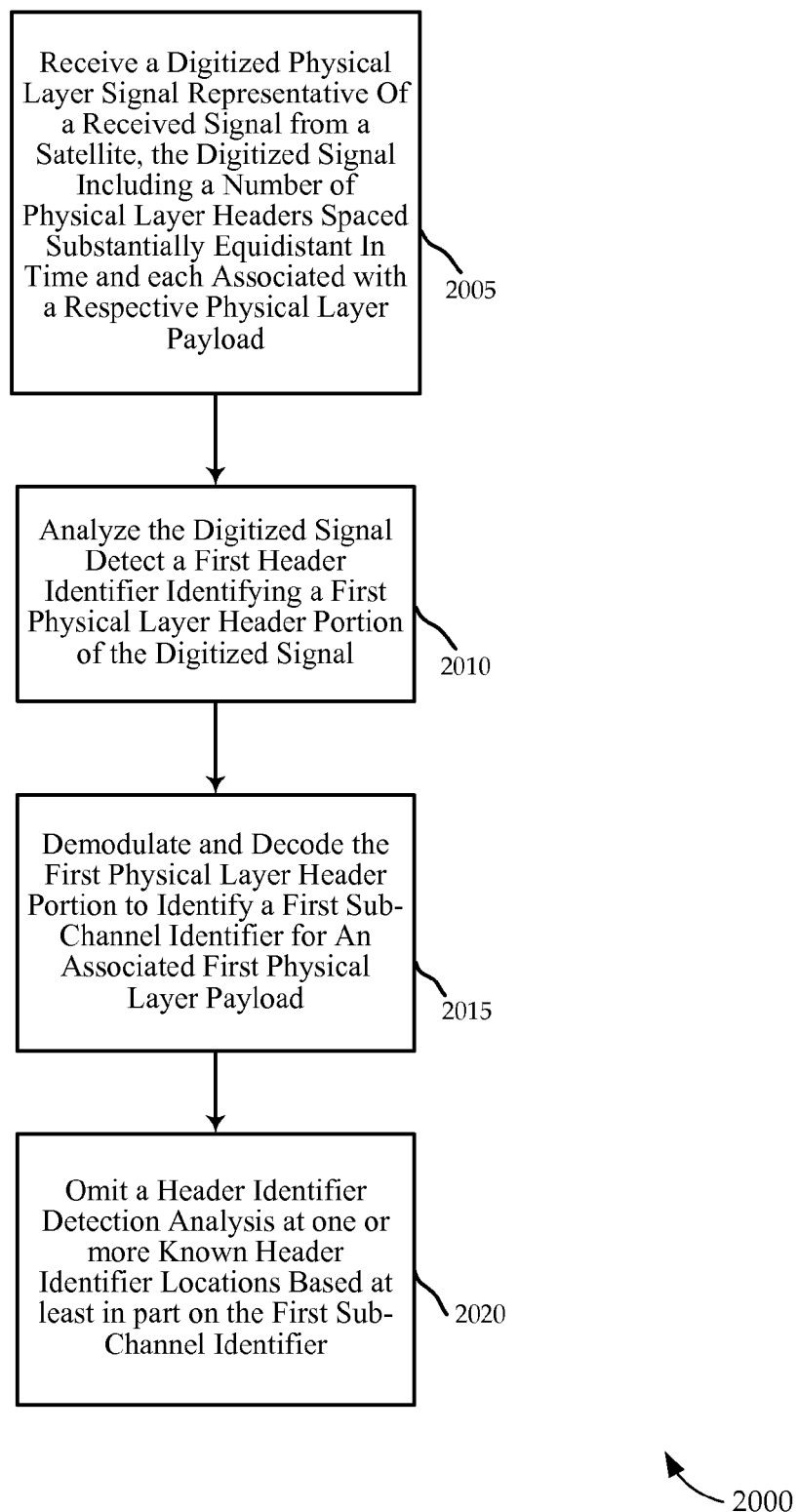
FIG. 20 is a flowchart illustrating a method for determining whether certain processing is to be performed on one or more physical layer headers according to various embodiments of the invention.

Referring next to FIG. 20, a flowchart is shown illustrating a method 2000 for determining whether certain processing is to be performed on one or more physical layer headers. The method may be performed, for example, in whole or in part, by the subscriber terminal 130 described with reference to FIG. 1, 10, or 11.

At block 2005, a digitized physical layer signal is received, the signal representative of a wireless signal received from a satellite. The wireless signal may be the satellite retransmission of the signal produced by the gateway 115 as described with reference to FIG. 4, 15, or 16A. The digitized signal includes a number of physical layer headers spaced substantially equidistant in time and each associated with a respective physical layer payload. At block 2010, the digitized signal is analyzed to detect a first header identifier identifying a first physical layer header portion of the digitized signal. At block 2015, the first physical layer header portion is demodulated and decoded to identify a first sub-channel identifier for an associated first physical layer payload. At block 2020, a header identifier detection analysis at one or more known header identifier locations is omitted, the omission based at least in part on the first sub-channel identifier.

Figure 21:
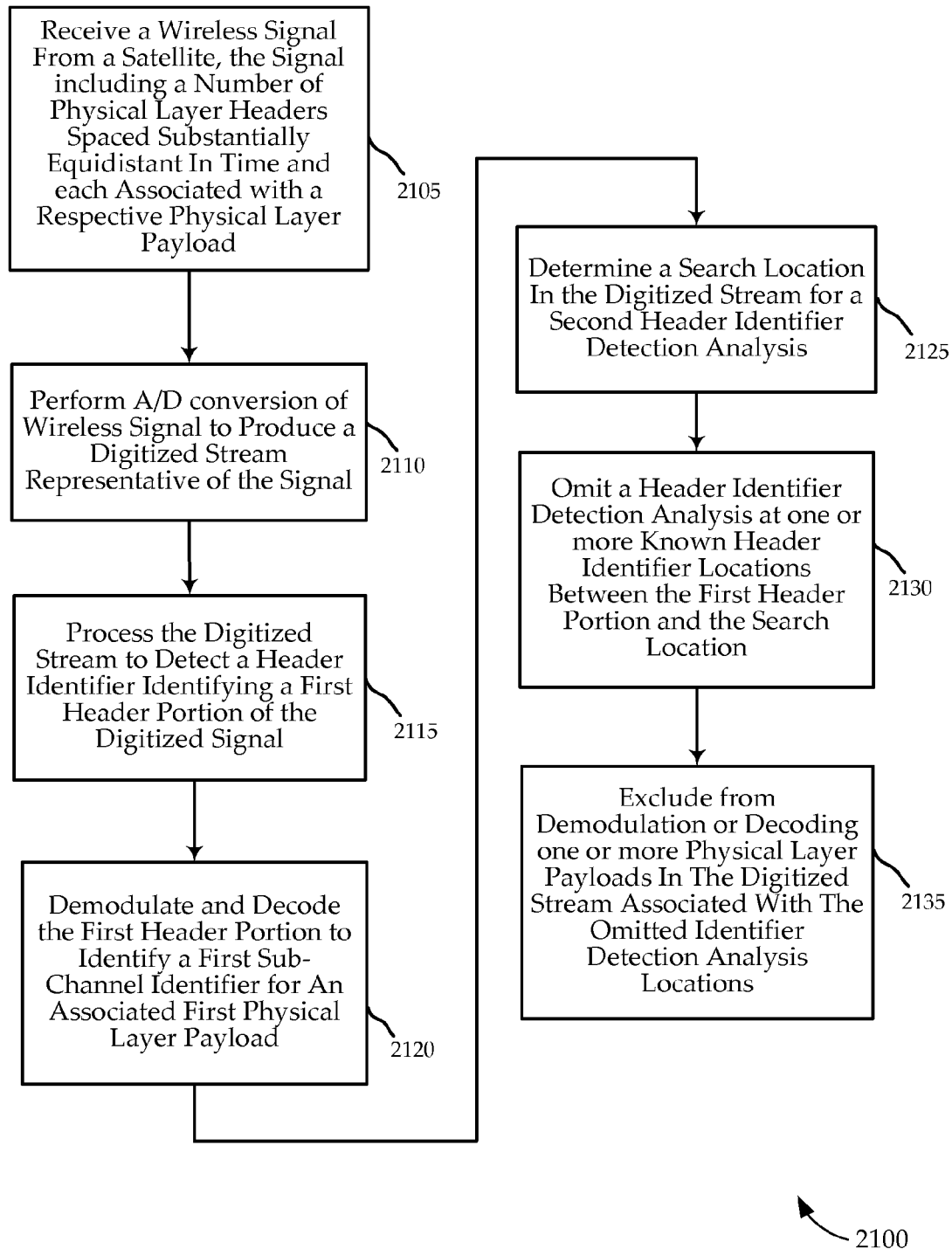
FIG. 21 is a flowchart illustrating a method for determining whether certain processing and analysis is to be performed on one or more physical layer headers and their associated payloads according to various embodiments of the invention.

Referring next to FIG. 21, a flowchart is shown illustrating a method 2100 for determining whether certain processing and analysis is to be performed on one or more physical layer headers and their associated payloads. The method may be performed, for example, in whole or in part, by the subscriber terminal 130 described with reference to FIG. 1, 10, or 11.

At block 2105, a wireless signal is received from a satellite. The wireless signal may be the satellite retransmission of the signal produced by the gateway 115 as described with reference to FIG. 1, 4, 15, or 16A. The signal includes a number of physical layer headers spaced substantially equidistant in time and each associated with a respective physical layer payload. At block 2110, an analog to digital conversion is performed on the received wireless signal to produce a digitized stream representative of the signal.

At block 2115, the digitized stream is processed to detect a header identifier identifying a first header portion of a physical layer frame of the digitized signal. At block 2120, the first physical layer header portion is demodulated and decoded to identify a first sub-channel identifier for an associated first physical layer payload. At block 2125, a search location is identified in the digitized stream for a second header identifier detection analysis. At block 2130, the header identifier detection analysis is omitted at one or more known header identifier locations between the first header portion and the search location. At block 2135, one or more physical layer payloads associated with the omitted identifier detection analysis locations are excluded from demodulation or decoding.

Figure 22:
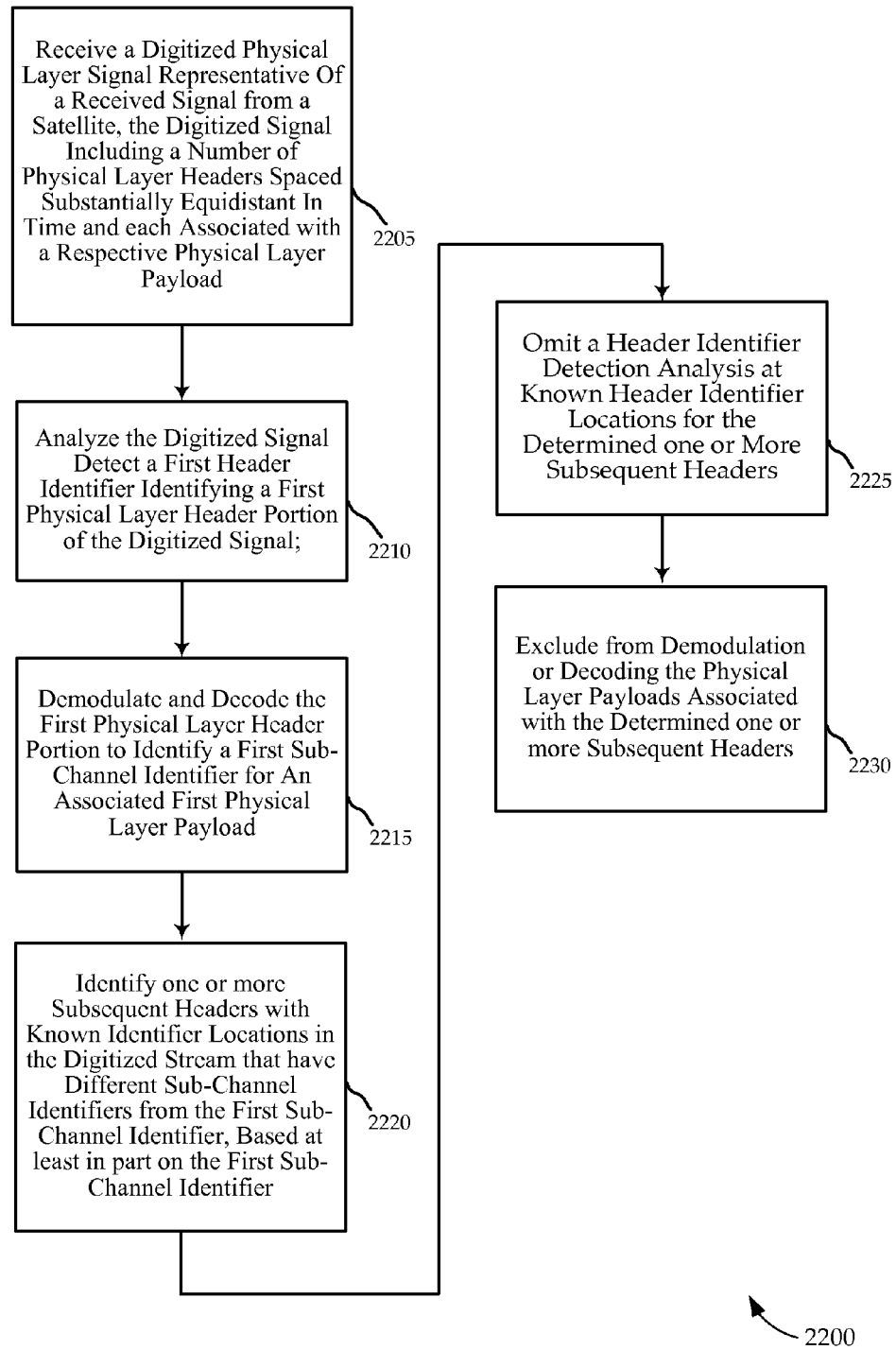
FIG. 22 is a flowchart illustrating a method for determining whether header identifier detection analysis is to be performed on one or more physical layer headers and their associated payloads according to various embodiments of the invention.

Referring next to FIG. 22, a flowchart is shown illustrating a method 2200 for determining whether header identifier detection analysis is to be performed on one or more physical layer headers and their associated payloads. The method may be performed, for example, in whole or in part, by the subscriber terminal 130 described with reference to FIG. 1, 10, or 11.

At block 2205, a digitized physical layer signal is received representative of a received signal from a satellite. The digitized signal includes a number of physical layer headers spaced substantially equidistant in time and each associated with a respective physical layer payload. At block 2210, the digitized signal is analyzed to detect a first header identifier identifying a first physical layer header portion of the digitized signal. At block 2215, the first physical layer header portion is demodulated and decoded to identify a first sub-channel identifier for an associated first physical layer payload.

At block 2220, one or more subsequent physical layer headers with known header identifier locations in the digitized stream are identified that have different sub-channel identifiers from the first sub-channel identifier. This identification may be based, at least in part, on the first sub-channel identifier. At block 2225, a header identifier detection analysis is omitted at known header identifier locations for the determined one or more subsequent headers. At block 2230, the physical layer payloads associated with the determined one or more subsequent headers are excluded from demodulation or decoding.

Figure 23:
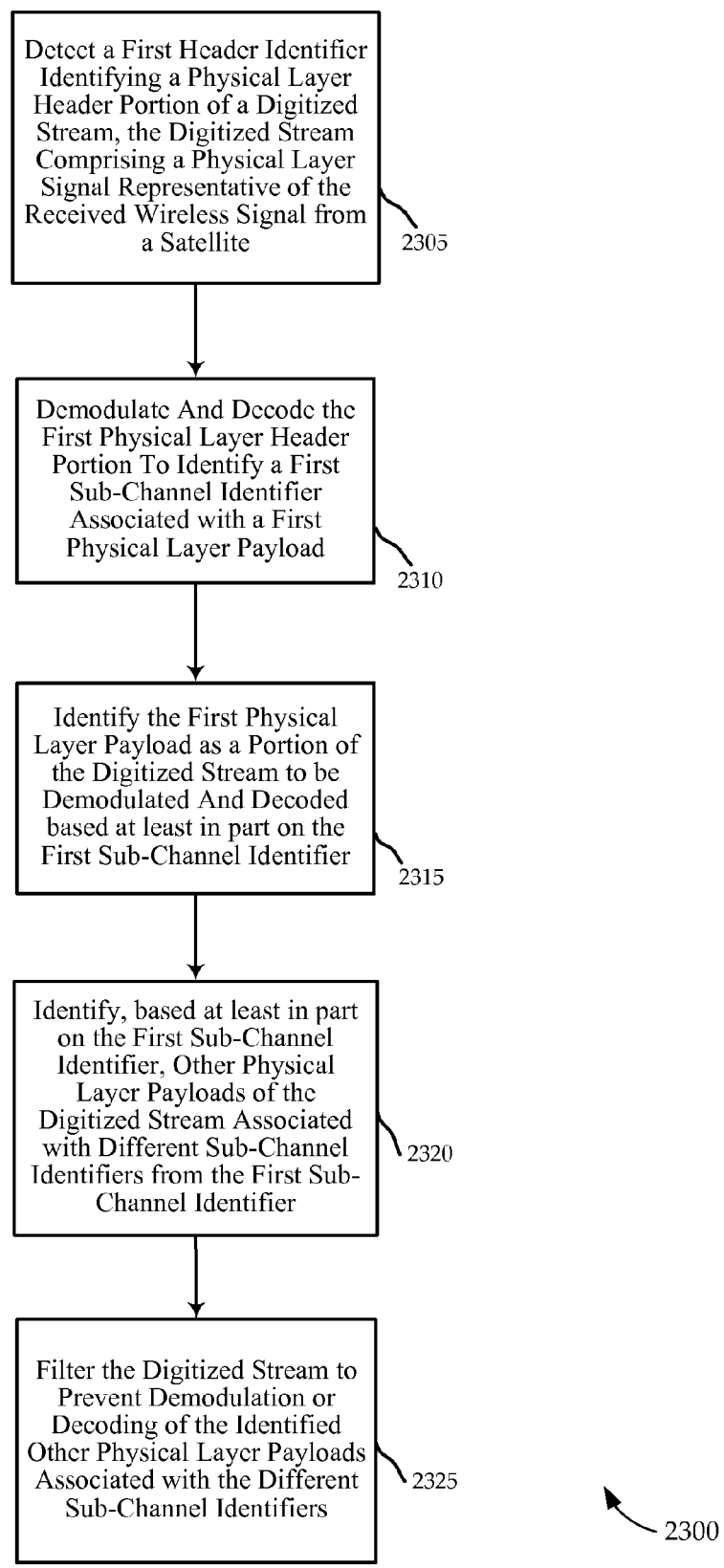
FIG. 23 is a flowchart illustrating a method for filtering a digitized stream to prevent demodulation or decoding of certain physical layer payloads according to various embodiments of the invention.

Referring next to FIG. 23, a flowchart is shown illustrating a method 2300 for filtering a digitized stream to prevent demodulation or decoding of certain physical layer payloads. The method may be performed, for example, in whole or in part, by the subscriber terminal 130 described with reference to FIG. 1, 10, or 11.

At block 2305, a first header identifier is detected, identifying a physical layer header portion of a digitized physical layer signal representative of the received wireless signal from a satellite. At block 2310, the first physical layer header portion is demodulated and decoded to identify a first sub-channel identifier associated with a first physical layer payload. At block 2315, the first physical layer payload is identified as a portion of the digitized stream to be demodulated and decoded based at least in part on the first sub-channel identifier. At block 2320, other physical layer payloads of the digitized stream associated with different sub-channel identifiers are identified. This identification is based at least in part on the first sub-channel identifier. At block 2325, the digitized stream is filtered to prevent demodulation or decoding of the identified other physical layer payloads associated with the different sub-channel identifiers.

Figure 24:
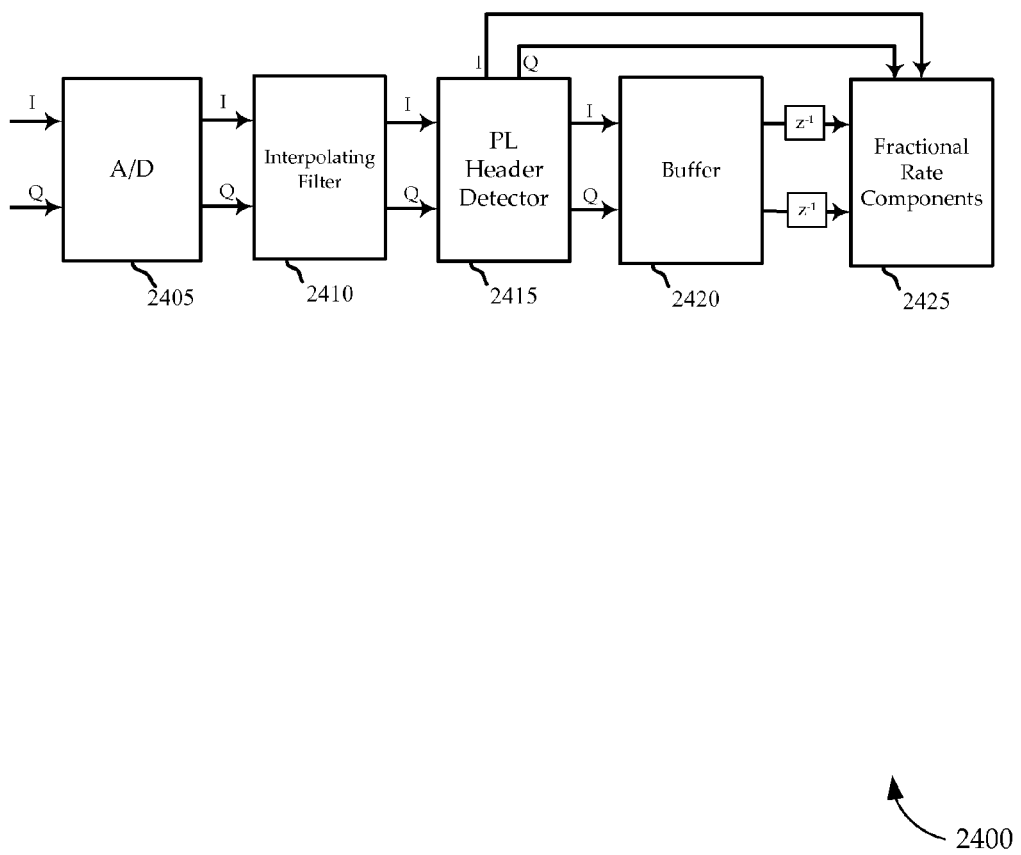
FIG. 24 is a block diagram of certain components of a subscriber terminal configured according to various embodiments of the invention.

Referring next to FIG. 24, an embodiment of certain components 2400 of a subscriber terminal (e.g., the subscriber terminal 130 of FIG. 1) is shown in block diagram form. In this embodiment, the components include an A/D 2405, an interpolating filter 2410, a PL header detector 2415, a buffer 2420, and the fractional rate components 2425. These units of the device may, individually or collectively, be implemented with one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors. Each unit may include memory, or accessed memory may be elsewhere on or off the terminal 130. In one embodiment, the interpolating filter 2410, PL header detector 2415, buffer 2420, and at least some of the fractional rate components 2425 are implemented on a single processor.

A wireless signal transmitted via satellite according to the modified DVB-S2 format discussed with reference to FIG. 6A is received by a subscriber terminal 130 including components 2400. This signal may be the downstream signal 135, 150 of FIG. 1 employing ACM, and including a number of physical layer headers (e.g., PL headers 650) spaced substantially equidistant in time and each associated with a respective physical layer payload. The physical layer headers each include a modified PLSCODE 660 which includes a sub-channel identifier formatted to allow payload filtering by a receiver to prevent the payload of inapplicable sub-channels from being demodulated or decoded.

The received wireless signal is downconverted and separated into in-phase and quadrature components, and received by the A/D 2405, and may output a stream of data. The interpolating filter 2410 may further process and equalize the stream of data to produce a one sample per symbol output. The output of the interpolating filter 2410 is received by the PL header detector 2415, which is configured to identify (e.g., by correlating known SOF patterns with the SOF 655) and extract a PL header 650 for forwarding to the fractional rate components 2425. In this embodiment, the fractional rate components 2425 may include the header content unit 1130, demod unit 1135, and decoder unit 1140, which may be configured to run at only fractional speeds (e.g., ⅛ or ¼ speed). The XFECFRAME 645 (or perhaps the entire PL frame 665) may then be buffered in buffer 2420.

The header content processing may then occur at fractional speeds, wherein the sub-channel identifier may be extracted from the PLSCODE 660. Based on this sub-channel identifier and the known spaces between headers, the PL header detector 2415 may identify a next search location for a header identifier detection analysis, and in some embodiments omit a header identifier detection analysis at intermediate locations.

It should be noted that the methods, systems and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices or other computer-readable mediums for storing information. The term "computer-readable medium" includes, but is not limited to, portable or fixed storage devices, optical storage devices, wireless channels, a sim card, other smart cards, and various other mediums capable of storing, containing or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A terminal to receive a signal transmitted by a satellite, the terminal comprising:
    a receiver configured to receive the signal transmitted by the satellite; and
    a header processor, communicatively coupled with the receiver, and configured to:
        receive a digitized stream comprising a physical layer signal representative of the received signal, the digitized stream including a plurality of physical layer headers spaced substantially equidistant in time and each associated with a respective physical layer payload;
        analyze the digitized stream to detect a first header identifier identifying a first physical layer header portion of the digitized stream;
        demodulate and decode the first physical layer header portion to identify a first sub-channel identifier for an associated first physical layer payload;
        determine a search location in the digitized stream for a second header identifier detection analysis; and
        determine not to perform a header identifier detection analysis in the digitized stream at one or more known header identifier locations between the first physical layer header portion and the search location, responsive to the first sub-channel identifier.

2. The terminal of claim 1, wherein the filter is further configured to determine whether the first sub-channel identifier is an identifier associated with a physical layer payload to be filtered from demodulation and decoding.

3. The terminal of claim 2, wherein the filter is further configured to:
    identify the physical layer payload associated with the first sub-channel identifier as data to be filtered to prevent demodulation and decoding; and
    filter the digitized stream to exclude the identified physical layer payload from demodulation and decoding.

4. The terminal of claim 2, wherein the filter is further configured to:
    identify the physical layer payload associated with the first sub-channel identifier as data to be forwarded for demodulation and decoding; and
    forward the identified physical layer payload.

5. The terminal of claim 4, further comprising:
    a demodulator configured to receive and demodulate the forwarded physical layer payload associated with the second header; and
    a decoder configured to decode the demodulated physical layer payload,
    wherein the demodulator and decoder are each configured to demodulate and decode only a subset of the plurality of physical layer payloads in the digitized stream.

6. The terminal of claim 2, wherein the filter is further configured to:
    store one or more sub-channel identifiers indicating whether a physical layer payload is to be demodulated and decoded; and
    determine whether the first sub-channel identifier is the identifier associated with the physical layer payload to be filtered by accessing the stored sub-channel identifiers.

7. The terminal of claim 1, wherein,
    the plurality of physical layer headers spaced substantially equidistant in time each include one of a plurality of sub-channel identifiers; and
    each one of at least a subset of the sub-channel identifiers recur at a regular interval in time in the digitized stream.

8. The terminal of claim 7, wherein the header processor is configured to determine the search location in the digitized stream for the second header identifier detection based at least in part on the regular interval.

9. The terminal of claim 1, wherein,
    the plurality of physical layer headers spaced substantially equidistant in time each include one of a plurality of sub-channel identifiers; and
    each one of at least a subset of the sub-channel identifiers do not recur at a regular interval in time.

10. The terminal of claim 1, wherein the header processor is configured to omit the header identifier detection analysis in known header identifier locations responsive to a minimum interval between same sub-channel identifiers.

11. The terminal of claim 1, wherein the header processor is configured to determine the search location for the second header identifier detection analysis responsive to the first sub-channel identifier.

12. The terminal of claim 1, wherein the header processor is further configured to:
    receive data identifying modified spacing between the plurality of physical layer headers; and
    change spacing in time between each header identifier detection analysis to account for the modified spacing.

13. The terminal of claim 1, wherein,
    the received signal comprises a modified digital video broadcasting signal on a single carrier;
    the first header identifier comprises a start of frame (SOF) pattern; and
    the first physical layer header portion comprises a modified physical layer signaling (PLS) code including sub-channel identifier information and an indication of a dynamically assigned modulation and coding format.

14. A processor for processing a digitized representation of a signal received from a satellite, the processor comprising:
    a header processor configured to:
        receive a digitized stream comprising a physical layer signal representative of the received signal, the digitized stream including a plurality of physical layer headers spaced substantially equidistant in time and each associated with a respective physical layer payload;
        analyze the digitized stream to detect a first header identifier identifying a first physical layer header portion of the digitized stream;
        demodulate and decode the first physical layer header portion to identify a first sub-channel identifier for an associated first physical layer payload;
        determine one or more subsequent headers having different sub-channel identifiers from the first sub-channel identifier, the determination based at least in part on the first sub-channel identifier; and determine not to perform a header identifier detection analysis at known header identifier locations for the determined one or more subsequent headers.

15. A satellite communications system comprising:
a gateway configured to transmit a signal to a satellite for retransmission to a terminal;
the satellite, communicatively coupled with the terminal and the gateway, and configured to receive the signal from the gateway and retransmit the signal to the terminal; and
the terminal comprising:
a receiver configured to receive the signal transmitted by the satellite;
a header processor communicatively coupled with the receiver and configured to:
receive a digitized stream comprising a physical layer signal representative of the signal, the digitized stream including a plurality of physical layer headers spaced substantially equidistant in time and each associated with a respective physical layer payload;
analyze the digitized stream to detect a first header identifier identifying a first physical layer header portion of the digitized stream;
demodulate and decode the first physical layer header portion to identify a first sub-channel identifier for an associated first physical layer payload;
determine, responsive to the first sub-channel identifier, one or more subsequent header identifier locations in the digitized stream that have other sub-channel identifiers different from the first sub-channel identifier; and
omit an identifier detection analysis at the determined one or more header identifier locations; and
a filter communicatively coupled with the header processor, and configured to exclude from demodulation and decoding one or more physical layer payloads located in the digitized stream and associated with the other sub-channel identifiers.

16. A method of processing a digital representation of a signal received from a satellite, the method comprising:
detecting a first header identifier identifying a physical layer header portion of a digitized stream, the digitized stream comprising a physical layer signal representative of the signal received from the satellite;
demodulating and decoding the first physical layer header portion to identify a first sub-channel identifier associated with a first physical layer payload;
identifying the first physical layer payload as a portion of the digitized stream to be demodulated and decoded responsive to the first sub-channel identifier;
identifying, responsive to the first sub-channel identifier, other physical layer payloads of the digitized stream associated with other sub-channel identifiers different from the first sub-channel identifier; and
determining not to perform demodulation and decoding of the other physical layer payloads associated with the other sub-channel identifiers.

17. The method of claim 16, further comprising:
determining whether the first sub-channel identifier is an identifier associated with a physical layer payload to be filtered from demodulation and decoding.

18. The method of claim 16, further comprising:
demodulating and decoding a second physical layer header portion of the digitized stream to identify a second sub-channel identifier associated with a second physical layer payload;
identifying the physical layer payload associated with the second sub-channel identifier as data to be filtered to prevent demodulation and decoding; and
filtering the digitized stream to exclude from demodulation or decoding the identified physical layer payload associated with the second sub-channel identifier.

19. The method of claim 16, wherein,
the digitized stream includes a plurality of physical layer headers spaced substantially equidistant in time, wherein each of at least a subset of the physical layer headers include one of a plurality of sub-channel identifiers; and
each one of at least a subset of the plurality of sub-channel identifiers recur at a regular interval in time in the digitized stream.

20. The method of claim 19, further comprising:
determining a search location in the digitized stream for a second header identifier detection analysis responsive to the regular interval.

21. The method of claim 19, further comprising:
omitting a header identifier detection analysis for known physical layer header locations responsive to the regular interval.

22. The method of claim 16, further comprising:
omitting a header identifier detection analysis responsive to a minimum interval between same sub-channel identifiers.

23. The method of claim 16, further comprising:
determining a search location in the digitized stream for a second header identifier detection analysis responsive to the first sub-channel identifier.

24. The method of claim 16, further comprising:
receiving data identifying modified spacing between the plurality of physical layer headers; and
changing spacing in time between each header identifier detection analysis to account for the modified spacing.

25. The terminal of claim 1, further comprising:
a filter, communicatively coupled with the header processor, and configured to exclude from demodulation and decoding one or more physical layer payloads in the digitized stream associated with the one or more known header identifier locations.

26. The terminal of claim 1, wherein,
the first physical layer header portion comprises the first header identifier; and
the first header identifier comprises a unique word known at the terminal.

27. The processor of claim 14, further comprising:
a filter, communicatively coupled with the header processor, and configured to exclude from demodulation and decoding one or more physical layer payloads in the digitized stream associated with the one or more subsequent headers.

28. The method of claim 16, further comprising:
filtering the digitized stream to prevent the other physical layer payloads associated with the other sub-channel identifiers from being demodulated and decoded.

29. A method to receive a signal transmitted by a satellite, the method comprising:
receiving a digitized stream comprising a physical layer signal representative of the received signal, the digitized stream including a plurality of physical layer headers spaced substantially equidistant in time and each associated with a respective physical layer payload;
analyzing the digitized stream to detect a first physical layer header portion of the digitized stream;

processing the first physical layer header portion to identify a first sub-channel identifier for an associated first physical layer payload;

determining a search location in the digitized stream for a second header identifier detection analysis; and determining, responsive to the first sub-channel identifier, not to perform a header detection analysis in the digitized stream at one or more known header identifier locations between the first physical layer header portion and the search location.

30. The method of claim 29, wherein the analyzing the digitized stream to detect a first physical layer header portion comprises:

detecting a first header identifier to identify the first physical layer header portion.

31. The method of claim 29, wherein processing the first physical layer header portion to identify the first sub-channel identifier comprises:

demodulating and decoding the first physical layer header portion to identify the first sub-channel identifier.

32. A terminal to receive a signal transmitted by a satellite, the terminal comprising:

means for receiving a digitized stream comprising a physical layer signal representative of the received signal, the digitized stream including a plurality of physical layer headers spaced substantially equidistant in time and each associated with a respective physical layer payload;

means for analyzing the digitized stream to detect a first header identifier identifying a first physical layer header portion of the digitized stream;

means for processing the first physical layer header portion to identify a first sub-channel identifier for an associated first physical layer payload;

means for determining a search location in the digitized stream for a second header identifier detection analysis; and means for determining not to perform a header identifier detection analysis in the digitized stream at one or more known header identifier locations between the first physical layer header portion and the search location responsive to the first sub-channel identifier.

33. The terminal of claim 32, wherein the means for processing the first physical layer header portion to identify the first sub-channel identifier comprises:

means for demodulating and decoding the first physical layer header portion to identify the first sub-channel identifier.

34. The terminal of claim 32, further comprising:

means for excluding from demodulation and decoding one or more physical layer payloads in the digitized stream associated with the one or more known header identifier locations.

\* \* \* \* \*